(12) United States Patent
Hoshinoya et al.

(10) Patent No.: US 9,694,664 B2
(45) Date of Patent: Jul. 4, 2017

(54) VEHICLE DRIVE APPARATUS

(71) Applicant: HONDA MOTOR CO., LTD., Tokyo (JP)

(72) Inventors: Takeshi Hoshinoya, Wako (JP); Keiichi Ooiso, Wako (JP); Yoshihito Kurizuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 14/034,558

(22) Filed: Sep. 24, 2013

(65) Prior Publication Data

US 2014/0097043 A1    Apr. 10, 2014

(30) Foreign Application Priority Data

Oct. 5, 2012    (JP) ................... 2012-223568

(51) Int. Cl.
| | |
|---|---|
| B60K 11/02 | (2006.01) |
| F16H 57/04 | (2010.01) |
| F01M 11/00 | (2006.01) |
| F16N 7/38 | (2006.01) |

(52) U.S. Cl.
CPC ......... *B60K 11/02* (2013.01); *F01M 11/0004* (2013.01); *F16H 57/0404* (2013.01); *F16H 57/045* (2013.01); *F16H 57/0405* (2013.01); *F16H 57/0476* (2013.01); *F16N 7/38* (2013.01)

(58) Field of Classification Search
CPC ............. F16H 57/0404; F16H 57/0424; F16H 57/0434; F16H 57/045; F16H 57/0452; F16H 57/0453; F01M 1/02; F01M 11/0004; F01M 11/0029; F01M 11/03; F01M 2011/0029; F01M 2011/0066; F01M 2011/021; F01M 2011/035

USPC ............ 184/106; 123/90.33, 196 R, 196 CP; 180/65.1

See application file for complete search history.

(56) References Cited

U.S. PATENT DOCUMENTS

| | | | | |
|---|---|---|---|---|
| 3,280,576 | A | * | 10/1966 | Endress .................. F25B 1/053 62/193 |
| 4,586,875 | A | * | 5/1986 | Aman, Jr. ................ F01M 1/16 184/6.24 |
| 4,805,490 | A | * | 2/1989 | Fuehrer et al. ............. 74/606 R |
| 4,815,431 | A | * | 3/1989 | Yorita .................... F01M 5/021 123/196 AB |
| 4,922,765 | A | * | 5/1990 | Hayakawa et al. .......... 74/15.88 |

(Continued)

FOREIGN PATENT DOCUMENTS

JP        03-37215 U        4/1991

*Primary Examiner* — Minh Truong
(74) *Attorney, Agent, or Firm* — Mori & Ward, LLP

(57) ABSTRACT

A vehicle drive apparatus includes a motor, a case, a cover member, a sensor, and a separate member. The case includes a reservoir to store liquid fluid. The sensor is provided in a first communication hole of the cover member and is fixed to the cover member. A second communication hole constitutes a part of a fluid flow path extending from an inside of the case to an outside of the case. The fluid flow path has an intake port through which the liquid fluid is to be drawn. The fluid flow path includes an inside fluid flow path provided from the second communication hole to the intake port. The separate member is fixed to the cover member to define the inside fluid flow path.

25 Claims, 15 Drawing Sheets

(56) References Cited

U.S. PATENT DOCUMENTS

| | | | | |
|---|---|---|---|---|
| 5,183,134 | A * | 2/1993 | Kuc | F01M 1/02 |
| | | | | 184/6.16 |
| 5,743,231 | A * | 4/1998 | Reinosa | F01M 5/02 |
| | | | | 123/196 S |
| 5,785,149 | A * | 7/1998 | Luyts | F04C 23/00 |
| | | | | 184/6.12 |
| 6,267,094 | B1 * | 7/2001 | Kuettner et al. | 123/196 A |
| 6,378,483 | B1 * | 4/2002 | Kato | 123/196 R |
| 7,040,275 | B2 * | 5/2006 | Ohta et al. | 123/195 C |
| 2002/0003064 | A1 * | 1/2002 | Ito et al. | 184/6.5 |
| 2010/0313849 | A1 * | 12/2010 | Stoner et al. | 123/350 |
| 2011/0041796 | A1 * | 2/2011 | Sachdev et al. | 123/196 A |
| 2011/0095717 | A1 * | 4/2011 | Takizawa | B60L 1/06 |
| | | | | 318/473 |
| 2012/0015772 | A1 * | 1/2012 | Kira et al. | 475/149 |
| 2013/0145879 | A1 * | 6/2013 | Nakamura et al. | 74/467 |
| 2013/0153338 | A1 * | 6/2013 | Yamauchi | 184/26 |
| 2013/0319366 | A1 * | 12/2013 | Karasawa | 123/196 R |
| 2014/0290407 | A1 * | 10/2014 | Tsuchihashi et al. | 74/405 |

\* cited by examiner

VEHICLE DRIVE APPARATUS

CROSS-REFERENCE TO RELATED APPLICATIONS

The present application claims priority under 35 U.S.C. §119 to Japanese Patent Application No. 2012-223568, filed Oct. 5, 2012, entitled "Vehicle Drive Apparatus." The contents of this application are incorporated herein by reference in their entirety.

BACKGROUND

1. Field

The present disclosure relates to a vehicle drive apparatus.

2. Description of the Related Art

Japanese Unexamined Utility Model Registration Application Publication No. 3-37215 describes an adaptor disposed in an oil pan so as to close an opening formed in the side wall of the oil pan. The adaptor is attached to the side wall of the oil pan using a plurality of fixing screws that passes through the side wall of the oil pan with a seal member and a ring-shaped washer therebetween in an oil-tight manner. In addition, the adaptor allows one of oil pan parts, such as an oil level sensor, an oil temperature sensor, or a heater, to be attached thereto in an oil-tight manner.

SUMMARY

According to one aspect of the present invention, a vehicle drive apparatus includes a motor, a case, a cover member, a sensor, and a separate member. The motor is connected to a wheel of a vehicle to transmit power from the motor to the wheel. The case includes a reservoir to store liquid fluid used for at least one of cooling of the motor, lubrication of the motor, cooling of a power transmission path between the motor and the wheel, and lubrication of the power transmission path. The case has an opening through which an inside of the case is to communicate with an outside of the case. The cover member is removably mounted on the opening to close the opening in a state where the cover member is mounted on the opening. The cover member constitutes a part of the case and includes at least two communication holes through which an inner side of the cover member is to communicate with an outer side of the cover member in a state where the cover member is mounted on the opening. The sensor is configured to detect a property of the liquid fluid and includes a detector disposed in the reservoir. The sensor is provided in a first communication hole of the at least two communication holes and is fixed to the cover member. A second communication hole of the at least two communication holes constitutes a part of a fluid flow path extending from the inside of the case to the outside of the case. The fluid flow path has an intake port through which the liquid fluid is to be drawn. The intake port is provided at a first end of the fluid flow path. The first end is disposed in the reservoir. The fluid flow path includes an inside fluid flow path provided from the second communication hole to the intake port. The separate member is fixed to the cover member to define the inside fluid flow path.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
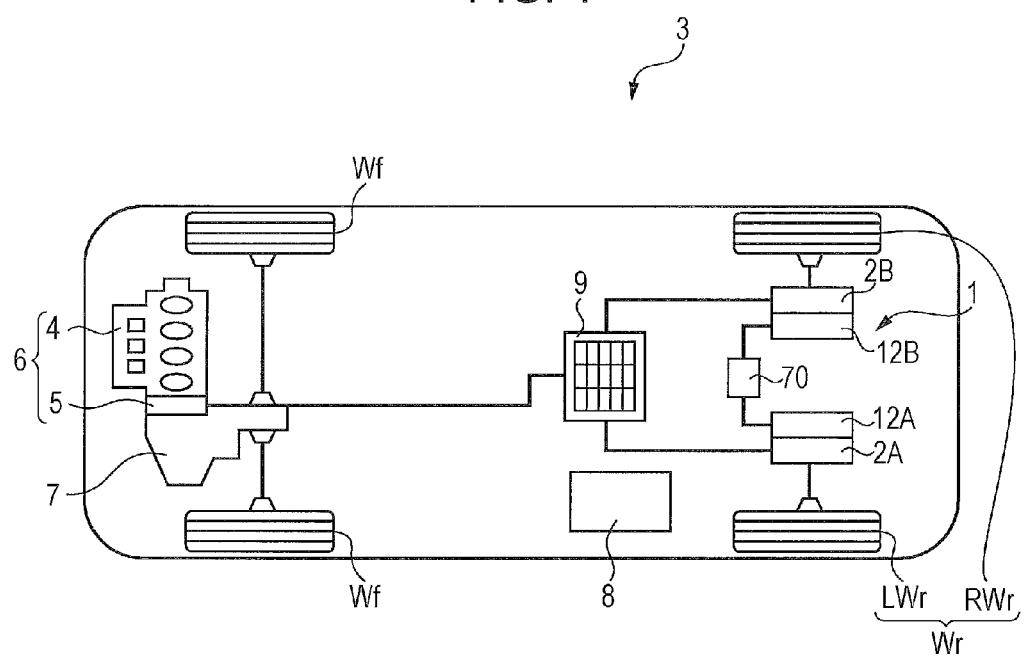
FIG. 1 is a block diagram of the configuration of a hybrid vehicle that allows a vehicle drive apparatus to be mounted therein according to an embodiment of the disclosure.

The embodiments will now be described with reference to the accompanying drawings, wherein like reference numerals designate corresponding or identical elements throughout the various drawings.

According to the present disclosure, a vehicle drive apparatus includes an electric motor as a drive source for driving wheels. For example, the vehicle drive apparatus is used in a vehicle of a drive system illustrated in FIG. 1. While the following description is made with reference to the vehicle drive apparatus for rear drive use, the vehicle drive apparatus may be adapted for front drive use. A vehicle 3 illustrated in FIG. 1 is a hybrid vehicle having a drive apparatus 6 in the front section thereof. The drive apparatus 6 includes an internal-combustion engine 4 and an electric motor 5 connected to the internal-combustion engine 4 in series. Hereinafter, the drive apparatus 6 is referred to as a "front drive apparatus 6". The power of the front drive apparatus 6 is transferred to front wheels Wf via a transmission 7. In addition, the power of a drive apparatus 1 disposed in the rear section of the vehicle separately from the front drive apparatus 6 is transferred to rear wheels Wr (RWr, LWr). Hereinafter, the rear drive apparatus 1 is referred to as a "rear drive apparatus 1". The electric motor 5 of the front drive apparatus 6 and a first electric motor 2A and a second electric motor 2B of the rear drive apparatus 1 on the rear wheel Wr side are connected to a battery 9. Thus, electric power can be supplied from the battery 9 to the electric motor 5 and the electric motors 2A and 2B, and regenerative energy can be supplied to the battery 9. As illustrated in FIG. 1, the vehicle 3 further includes a control unit 8 for performing overall control of the vehicle 3.

Figure 2:
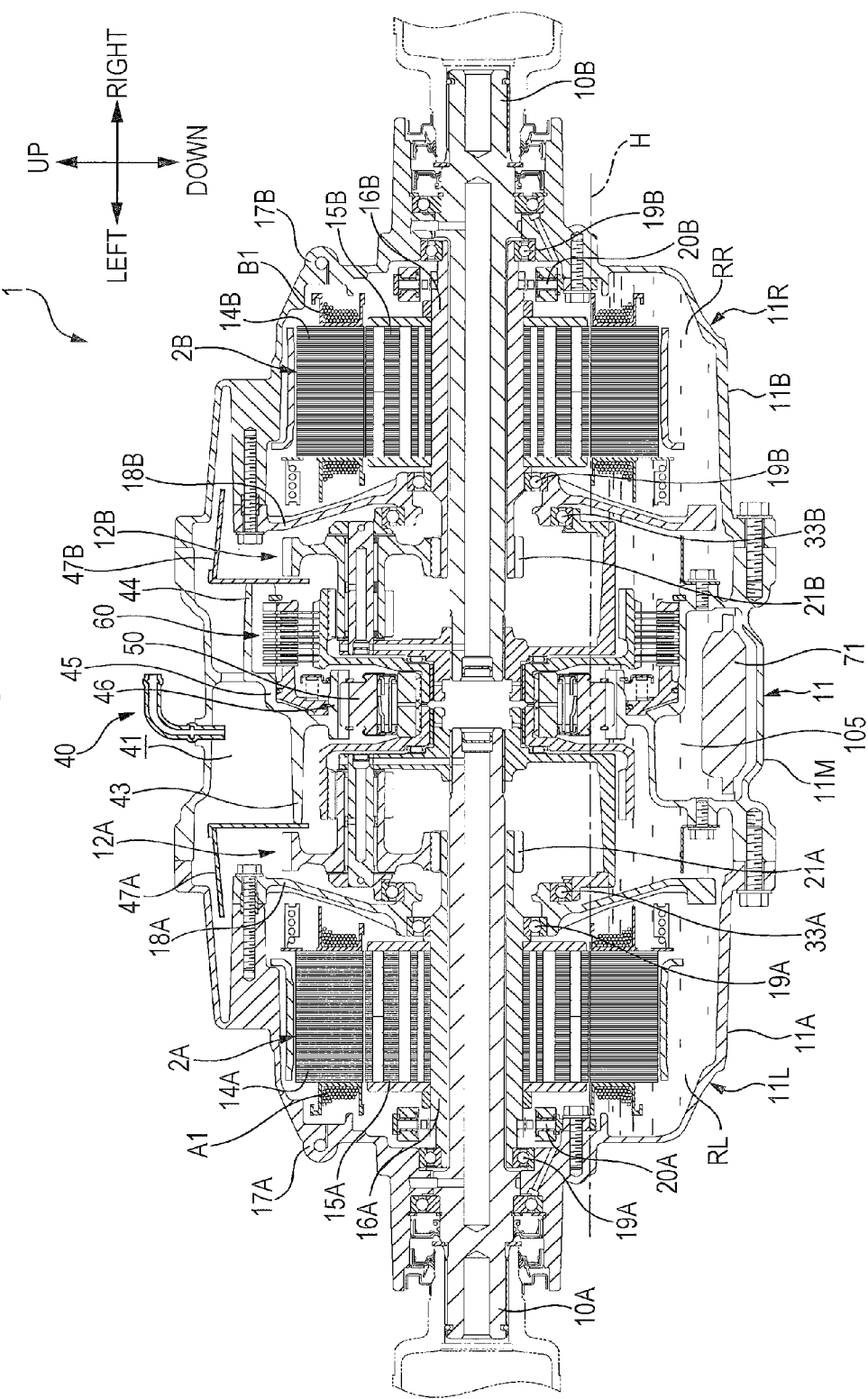
FIG. 2 is a longitudinal sectional view of a rear drive apparatus taken along a line II-II of FIG. 10 according to the embodiment.
Figure 3:
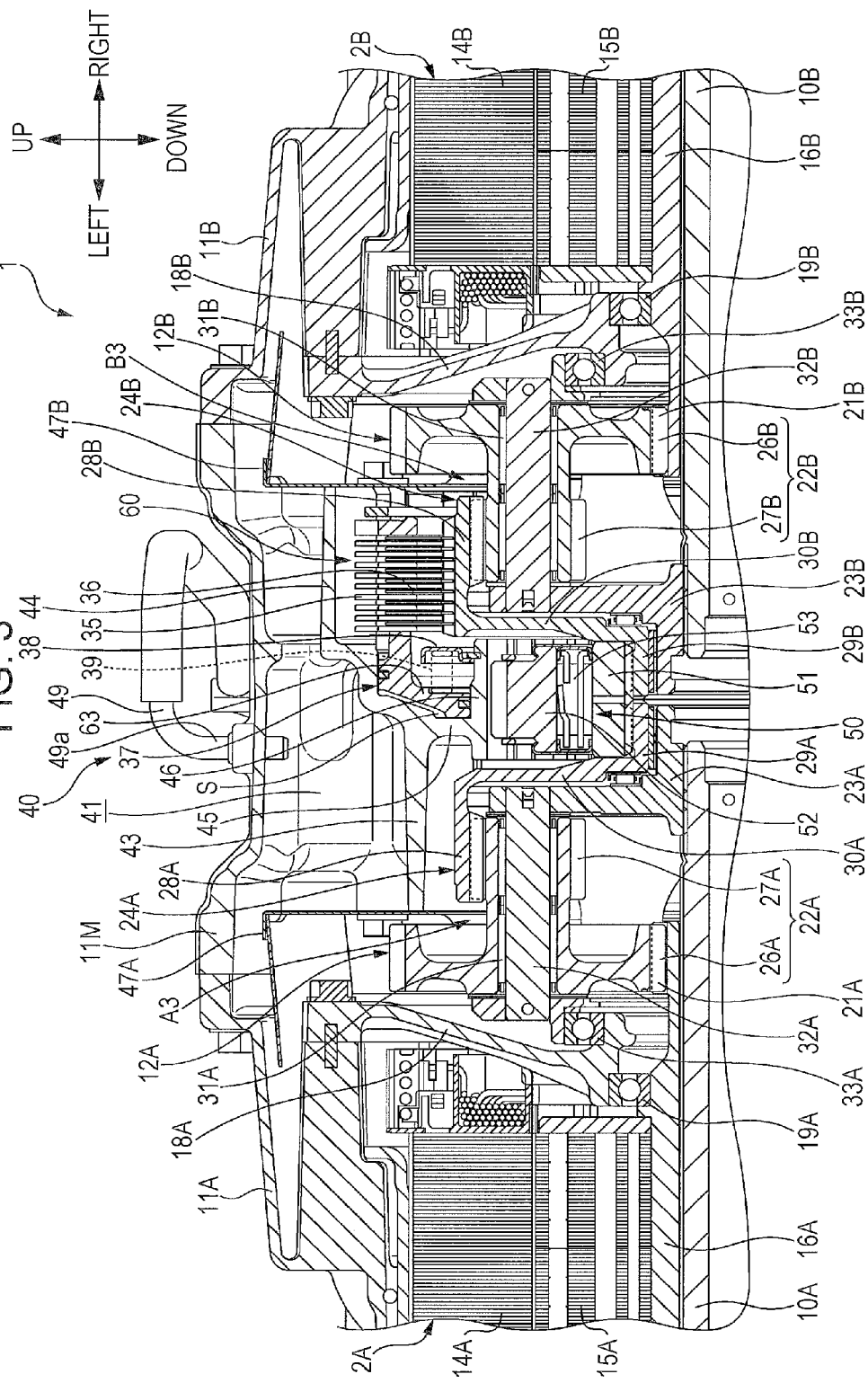
FIG. 3 is a partially enlarged cross-sectional view of the upper portion of the rear drive apparatus illustrated in FIG. 2.

The vehicle drive apparatus according to an exemplary embodiment of the disclosure is described first with reference to FIGS. 2 to 15. FIG. 2 is a longitudinal sectional view of the rear drive apparatus 1. FIG. 3 is a partially enlarged cross-sectional view of the upper portion of FIG. 2. In FIG. 3, a case 11 of the rear drive apparatus 1 is illustrated. The case 11 includes a middle case 11M disposed in the substantially middle thereof in the vehicle width direction and side cases 11A and 11B that are disposed so as to sandwich the middle case 11M from the left and the right. The case 11 has a substantially cylindrical shape. In the case 11, axle shafts 10A and 10B for the rear wheels Wr, the first and second electric motors 2A and 2B for driving the axle shafts, and first and second planetary gear reducers 12A and 12B for reducing the number of drive rotations of the first and second electric motors 2A and 2B are coaxially disposed in a line. The axle shaft 10A, the first electric motor 2A, and the first planetary gear reducer 12A control driving of the left rear wheel Lwr. The axle shaft 10B, the second electric motor 2B, and the second planetary gear reducer 12B control driving of the right rear wheel Rwr. The axle shaft 10A, the first electric motor 2A, and the first planetary gear reducer 12A are disposed so as to be symmetrical with respect to the axle shaft 10B, the second electric motor 2B, and the second planetary gear reducer 12B in the vehicle width direction inside the case 11. The left rear wheel Lwr is located on the opposite side of the first electric motor 2A from the first planetary gear reducer 12A. The right rear wheel Rwr is located on the opposite side of the second electric motor 2B from the second planetary gear reducer 12B.

Figure 4:
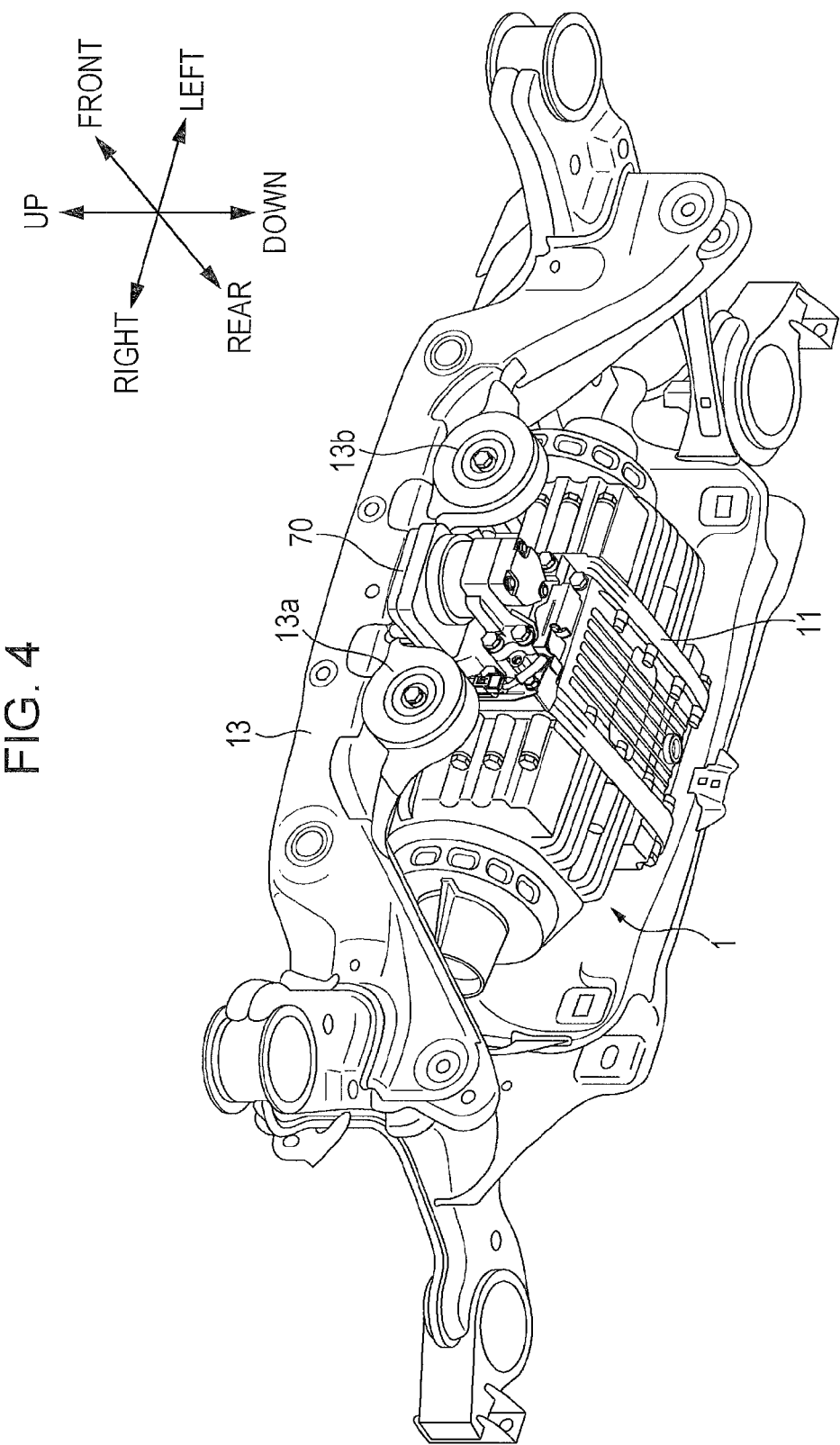
FIG. 4 is a perspective view of the vehicle drive apparatus mounted on a frame illustrated in FIG. 1.

The side of the side case 11A and the side of the side case 11B adjacent to the middle case 11M have partition walls 18A and 18B, respectively, each extending inwardly in the radial direction. The first electric motor 2A is disposed between the side case 11A and the partition wall 18A, and the second electric motor 2B is disposed between the side case 11B and the partition wall 18B. In addition, the first planetary gear reducer 12A is disposed in a space formed between the middle case 11M and the partition wall 18A, and the second planetary gear reducer 12B is disposed in a space formed between the middle case 11M and the partition wall 18B. Note that as illustrated in FIG. 2, according to the present exemplary embodiment, the left side case 11A and the middle case 11M forms a first case 11L that contains the first electric motor 2A and the first planetary gear reducer 12A. In addition, the right side case 11B and the middle case 11M form a second case 11R that contains the second electric motor 2B and the second planetary gear reducer 12B. The first case 11L includes a left reservoir portion RL that reserves oil serving as liquid fluid for lubricating and/or cooling at least one of the first electric motor 2A and a power transmission path, and the second case 11R includes a right reservoir portion RR that reserves oil serving as liquid fluid for lubricating and/or cooling at least one of the second electric motor 2B and a power transmission path. The left reservoir portion RL and the right reservoir portion RR are disposed next to each other in the vehicle width direction and communicate with each other via a left middle communication passage 107 (described below), a strainer container chamber 105, and a right middle communication passage (not illustrated). As illustrated in FIG. 4, the case 11 is supported by support portions 13a and 13b of a frame member 13, which is part of a main frame of the vehicle 3, and a frame of the rear drive apparatus 1 (not illustrated). The support portions 13a and 13b are disposed on the right and left sides of the frame member 13 in the vehicle width direction, respectively. Note that arrows in FIG. 4 indicates a positional relationship between the rear drive apparatus 1 and the vehicle when the rear drive apparatus 1 is mounted on the vehicle.

The rear drive apparatus 1 includes a breather device 40 that allows the inside of the case 11 to communicate with the outside. To prevent the inside air from having excessively high temperature and pressure, the breather device 40 allows the inside air to flow to the outside via a breather chamber 41. The breather chamber 41 is disposed in the upper portion of the case 11 in the vertical direction. The breather chamber 41 is configured to have a space formed by the outer wall of the middle case 11M, a first cylindrical wall 43 substantially horizontally extending toward the left side case 11A in the middle case 11M, a second cylindrical wall 44 substantially horizontally extending toward the right side case 11B, a right and left partition wall 45 that connects the inner end of the first cylindrical wall 43 to the inner end of the second cylindrical wall 44, a baffle plate 47A attached so as to be in contact with the top end of the first cylindrical wall 43 adjacent to the left side case 11A, and a baffle plate 47B attached so as to be in contact with the top end of the second cylindrical wall 44 adjacent to the right side case 11B.

The first cylindrical wall 43, the second cylindrical wall 44, and the right and left partition wall 45 form the bottom surface of the breather chamber 41. The first cylindrical wall 43 is located on the inner side of the second cylindrical wall 44 in the radial direction. The right and left partition wall 45 extends from the inner end of the second cylindrical wall 44 to the inner end of the first cylindrical wall 43 while curving and reducing its diameter. The right and left partition wall 45 further extends inwardly in the radial direction and reaches a third cylindrical wall 46 that extend substantially horizontally. The third cylindrical wall 46 is located on the inner side of each of the outer ends of the first cylindrical wall 43 and the second cylindrical wall 44 and is located in the substantially middle between the outer ends.

The baffle plate 47A is fixed to the middle case 11M so as to separate a space formed between the first cylindrical wall 43 and the outer wall of the middle case 11M from the first planetary gear reducer 12A. Similarly, the baffle plate 47B is fixed to the middle case 11M so as to separate a space formed between the second cylindrical wall 44 and the outer wall of the middle case 11M from the second planetary gear reducer 12B.

In addition, in the middle case 11M, an outside communication passage 49 that allows the breather chamber 41 to communicate with the outside is connected to the upper surface of the breather chamber 41 in the vertical direction. An end 49a of the outside communication passage 49 adjacent to the breather chamber 41 is disposed so as to face downward in the vertical direction. Accordingly, the oil is prevented from flowing to the outside via the outside communication passage 49.

In the first and second electric motors 2A and 2B, stators 14A and 14B are fixed to the side cases 11A and 11B so that ring-shaped rotors 15A and 15B are rotatably disposed on the inner periphery sides of the stators 14A and 14B, respectively. Cylindrical shafts 16A and 16B that surround the outer peripheries of the axle shafts 10A and 10B are joined to the inner peripheral portions of the rotors 15A and 15B, respectively. The cylindrical shafts 16A and 16B are supported by end walls 17A and 17B of the side cases 11A and 11B and the partition walls 18A and 18B via bearings 19A and 19B so as to be coaxial with the axle shafts 10A and 10B and rotatable relative to the axle shafts 10A and 10B, respectively. In addition, the end walls 17A and 17B, which are the outer peripheries of the cylindrical shafts 16A and 16B at one end, have resolvers 20A and 20B, respectively. The resolvers 20A and 20B feedback the rotational position information on the rotors 15A and 15B to controllers (not illustrated) of the first and second electric motors 2A and 2B, respectively. The first and second electric motors 2A and 2B including the stators 14A and 14B and the rotors 15A and 15B, respectively, have the same radius. The first and second electric motors 2A and 2B are mirror-symmetrically disposed. In addition, the axle shaft 10A and the cylindrical shaft 16A pass through the first electric motor 2A and extend beyond both the ends of the first electric motor 2A. Similarly, the axle shaft 10B and the cylindrical shaft 16B pass through the second electric motor 2B and extend beyond both the ends of the second electric motor 2B.

In addition, the first planetary gear reducer 12A includes a sun gear 21A, a ring gear 24A located on the outer peripheral side of the sun gear 21A, a plurality of planetary gears 22A that mesh with the sun gear 21A and the ring gear 24A, and a planetary carrier 23A that supports the planetary gears 22A. Similarly, the second planetary gear reducer 12B includes a sun gear 21B, a ring gear 24B located on the outer peripheral side of the sun gear 21B, a plurality of planetary gears 22B that mesh with the sun gear 21B and the ring gear 24B, and a planetary carrier 23B that supports the planetary gear 22B. The driving force of the first electric motor 2A is input from the sun gear 21A. Thereafter, the driving force having a reduced speed is output to the axle shaft 10A via the planetary carrier 23A. Similarly, the driving force of the second electric motor 2B is input from the sun gear 21B. Thereafter, the driving force having a reduced speed is output to the axle shaft 10B via the planetary carrier 23B.

The sun gear 21A (21B) is formed so as to be integrated with the cylindrical shaft 16A (16B). In addition, the planetary gear 22A (22B) is a double pinion including a first pinion 26A (26B) having a large diameter and a second pinion 27A (27B) having a diameter that is smaller than the large diameter. The first pinion 26A (26B) is directly meshed with the sun gear 21A (21B). In addition, the first pinion 26A (26B) and the second pinion 27A (27B) are integrated with each other so as to be coaxial and offset from each other in the axial direction. The planetary gear 22A (22B) is supported by a pinion shaft 32A (32B) of the planetary carrier 23A (23B) via a needle bearing 31A (31B). The inner end portion of the planetary carrier 23A (23B) extends inwardly in the radial direction and is spline-fitted to the axle shaft 10A (10B) so as to be supported by the axle shaft 10A (10B) and rotate in unison with the axle shaft 10A (10B). In addition, the planetary carrier 23A (23B) is supported by the partition wall 18A (18B) via a bearing 33A (33B).

The ring gear 24A (24B) includes a gear portion 28A (28B) having an inner peripheral surface meshed with the second pinion 27A (27B) having a smaller diameter, a small-diameter portion 29A (29B) having a diameter smaller than that of the gear portion 28A (28B) and facing the gear portion 28B (28A) in the middle of the case 11, and a connection portion 30A (30B) that connects, in the radial direction, the inner end of the gear portion 28A (28B) in the axial direction to the outer end of the small-diameter portion 29A (29B) in the axial direction.

The gear portions 28A and 28B face each other in the axial direction with the third cylindrical wall 46 therebetween. Note that the third cylindrical wall 46 is formed at the radially inner end of the right and left partition wall 45 of the middle case 11M. The outer peripheral surface of each of the small-diameter portions 29A and 29B is spline-fitted to an inner race 51 of a one-way clutch 50 (described in more detail below). Each of the ring gears 24A and 24B is connected to the inner race 51 of the one-way clutch 50 so as to rotate in unison with the inner race 51.

A hydraulic brake 60 is disposed between the second cylindrical wall 44 of the middle case 11M that constitutes the case 11 and the gear portion 28B of the ring gear 24B on the side of the second planetary gear reducer 12B so as to overlap the first pinion 26B in the radial direction and overlap the second pinion 27B in the axial direction. The hydraulic brake 60 resists rotation of the ring gear 24B. The hydraulic brake 60 includes a plurality of fixed plates 35 each spline-fitted to the inner peripheral surface of the second cylindrical wall 44 and a plurality of rotating plates 36 each spline-fitted to the outer peripheral surface of the gear portion 28B of the ring gear 24B. The fixed plates 35 and the rotating plates 36 are alternately arranged in the axial direction. The fixed plates 35 and the rotating plates 36 are subjected to engagement and disengagement operations performed by a ring-shaped piston 37. The ring-shaped piston 37 is movably contained in a ring-shaped cylinder chamber formed between the right and left partition wall 45 of the middle case 11M and the third cylindrical wall 46. In addition, the piston 37 is urged in a direction in which the fixed plate 35 is disengaged from the rotating plate 36 by an elastic member 39 supported by a strike plate 38 provided on the outer peripheral surface of the third cylindrical wall 46 at all times.

More specifically, a gap formed between the right and left partition wall 45 and the piston 37 serves as a working chamber S into which oil is directly introduced. If the pressure of the oil introduced into the working chamber S is higher than the urging force of the elastic member 39, the piston 37 advances (moves to the right). Thus, the fixed plate 35 is in pressure contact with the rotating plate 36 and is engaged with the rotating plate 36. In contrast, if the urging force of the elastic member 39S is higher than the pressure of the oil introduced into the working chamber, the piston 37 moves backward (moves to the left). Thus, the fixed plate 35 is separated from the rotating plate 36 and is disengaged from the rotating plate 36. Note that the hydraulic brake 60 is connected to an electric oil pump 70 (refer to, for example, FIG. 4) serving as a liquid fluid supply device.

In the hydraulic brake 60, the fixed plate 35 is supported by the second cylindrical wall 44 extending from the right and left partition wall 45 of the middle case 11M that constitutes the case 11. In addition, the rotating plate 36 is supported by the gear portion 28B of the ring gear 24B. Accordingly, if the fixed plate 35 is urged against the rotating plate 36 by the piston 37, a braking force is applied to the ring gear 24B due to friction resistance between the fixed plate 35 and the rotating plate 36 and, thus, the ring gear 24B is fixed. Subsequently, if the engagement caused by the piston 37 is released, the ring gear 24B can freely rotate. Note that as described above, the ring gears 24A and 24B are connected with each other. Accordingly, when the hydraulic brake 60 is engaged, a braking force is also applied to the ring gear 24A. Thus, the ring gear 24A is fixed. If the hydraulic brake 60 is released, the ring gear 24A can also freely rotate.

In addition, a space is formed between the connection portion 30A of the ring gear 24A and the connection portion 30B of the ring gear 24B. The one-way clutch 50 that transmits the power to the ring gears 24A and 24B in one direction and blocks the power to the ring gears 24A and 24B in the other direction is disposed in the space. The one-way clutch 50 has a plurality of sprags 53 between the inner race 51 and an outer race 52. The inner race 51 is spline-fitted to the small-diameter portions 29A of the ring gear 24A and the small-diameter portion 29B of the ring gear 24B so as to rotate in unison with the small-diameter portion 29A and the small-diameter portion 29B. In addition, the position of the outer race 52 is determined by the third cylindrical wall 46, and the rotation of the outer race 52 is stopped by the third cylindrical wall 46.

When the vehicle 3 moves forward by the power of the first electric motor 2A and the second electric motor 2B, the one-way clutch 50 engages the ring gears 24A and 24B and locks the rotation of the ring gears 24A and 24B. More specifically, when the rotation power in the forward direction (a rotational direction when the vehicle 3 moves forward) on the side of the first and second electric motors 2A and 2B is input to the rear wheels Wr, the one-way clutch 50 enters an engagement mode. In contrast, when the rotation power in the opposite direction on the side of the first and second electric motors 2A and 2B is input to the rear wheels Wr, the one-way clutch 50 enters a disengagement mode. When the rotation power in the forward direction on the side of the rear wheels Wr is input to the first and second electric motors 2A and 2B, the one-way clutch 50 enters a disengagement mode. In contrast, when the rotation power in the opposite direction on the side of the rear wheels Wr is input to the first and second electric motors 2A and 2B, the one-way clutch 50 enters an engagement mode.

As described above, in the rear drive apparatus 1 according to the present exemplary embodiment, the one-way clutch 50 and the hydraulic brake 60 are arranged in the power transmission path between the first and second electric motors 2A and 2B and the pair of rear wheels Wr in parallel. Note that the hydraulic brake 60 is controlled by the pressure of the oil supplied from the electric oil pump 70 so as to be switched among a release mode, a weakly tightening mode, and a tightening mode. For example, when the vehicle 3 moves forward by the driving power of the first and second electric motors 2A and 2B (during low speed travel or middle speed travel), the one-way clutch 50 enters the engagement mode and, thus, the power is transmittable. At that time, the hydraulic brake 60 is controlled so as to enter the weakly tightening mode. Accordingly, even when the input rotation power from the first and second electric motors 2A and 2B in the forward direction is temporarily decreased and, thus, the one-way clutch 50 enters a disengagement mode, the first and second electric motors 2A and 2B can transmit the power to the rear wheels Wr. In addition, when the vehicle 3 moves forward by the driving power of the internal-combustion engine 4 and/or the electric motor 5 (during high speed travel), the one-way clutch 50 enters a disengagement mode. In addition, hydraulic brake 60 is controlled so as to enter a release mode. Thus, excess rotation of the first and second electric motors 2A and 2B can be prevented. In contrast, when the vehicle 3 moves backward or enters a regenerative mode, the one-way clutch 50 enters a disengagement mode. Accordingly, if the hydraulic brake 60 is controlled to enter the tightening mode, the rotation power of the first and second electric motors 2A and 2B in the opposite direction is output to the rear wheels Wr. Alternatively, the rotation power of the rear wheels Wr in the forward direction is input to the first and second electric motors 2A and 2B.

Figure 5:
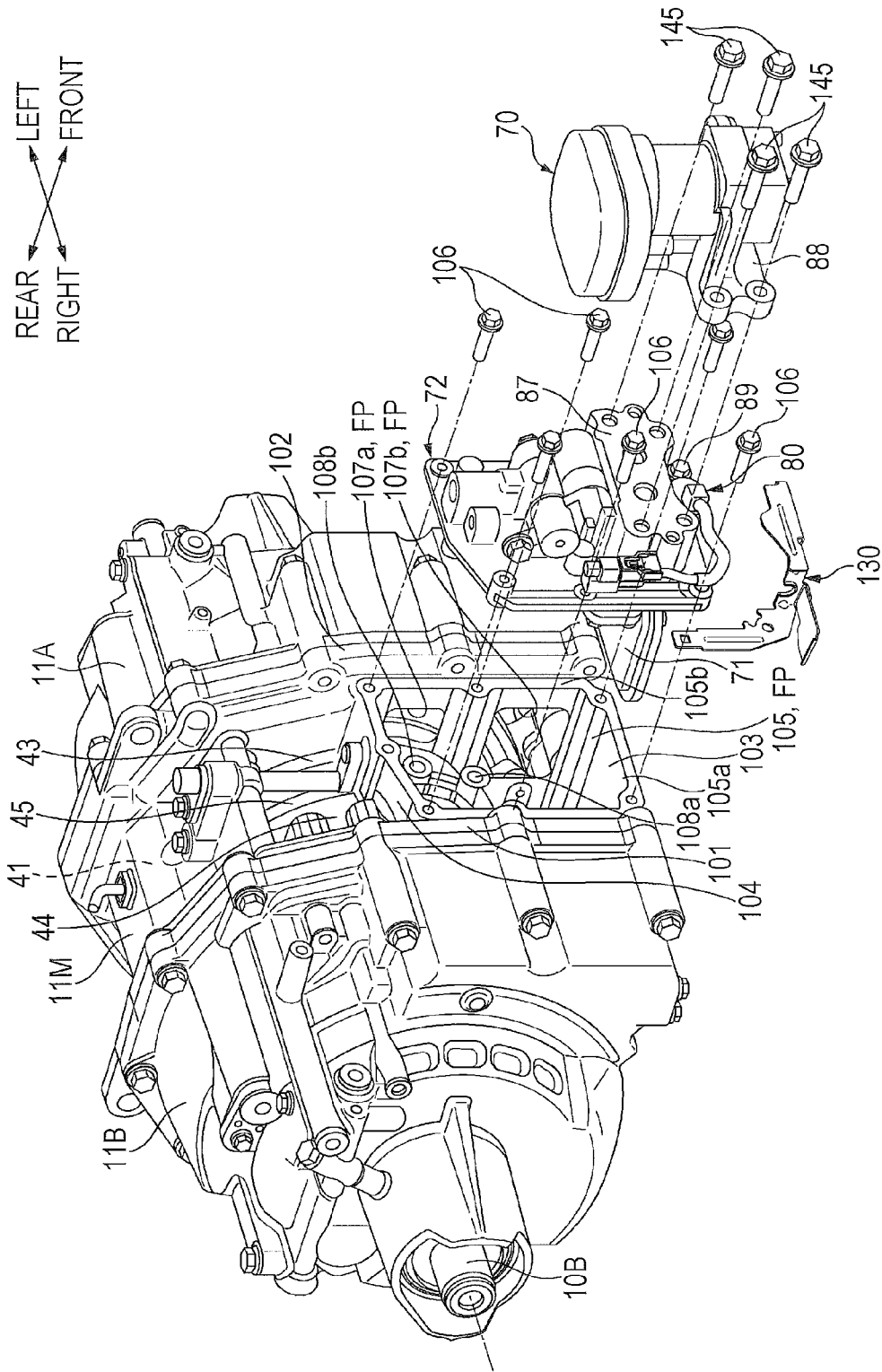
FIG. 5 is an exploded perspective view of the rear drive apparatus with an electric oil pump removed.
Figure 9:
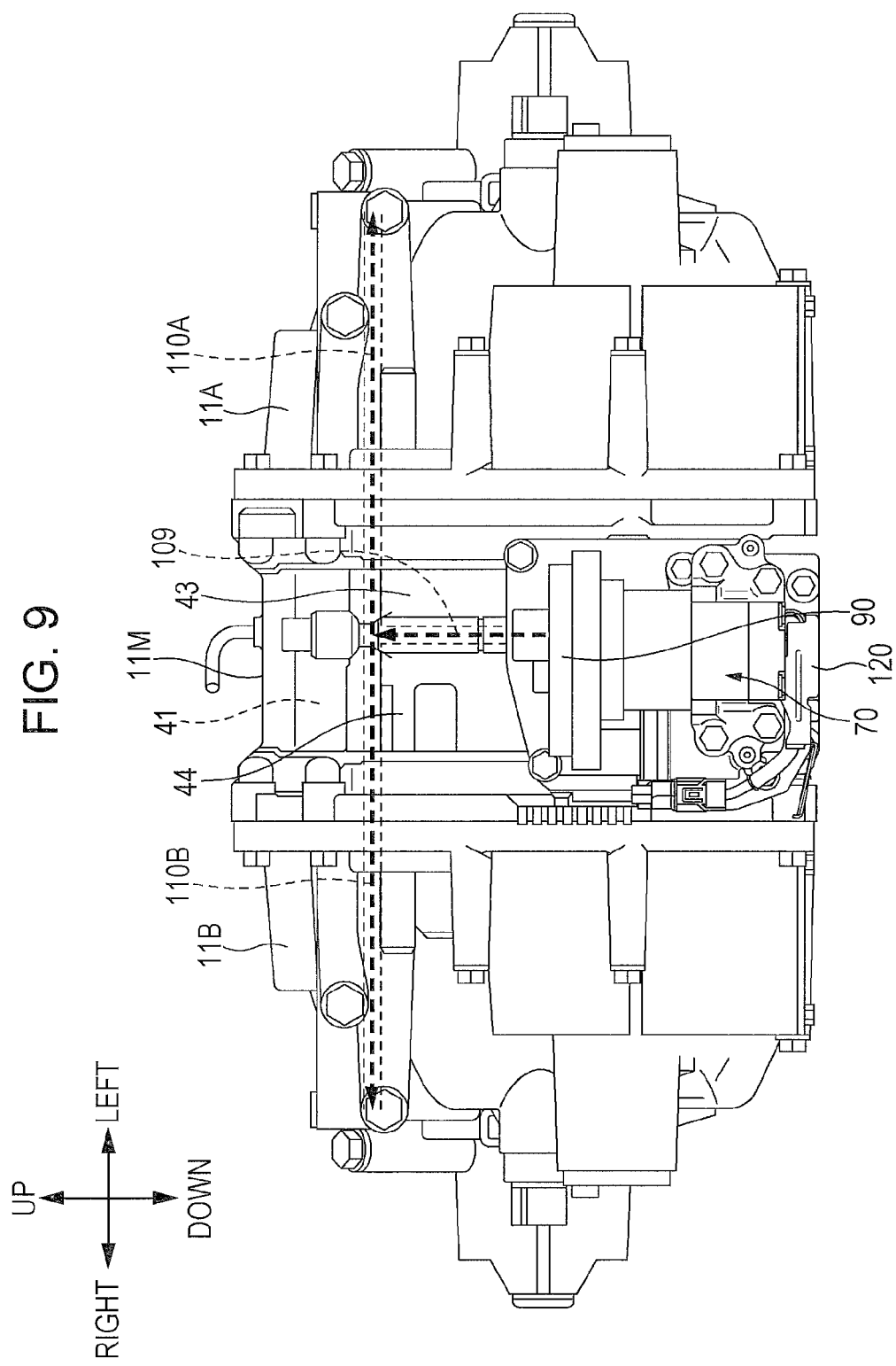
FIG. 9 is a schematic front view of the rear drive apparatus illustrating the flow of oil.

In addition, as illustrated in FIGS. 5 and 9, the first cylindrical wall 43 and the second cylindrical wall 44 of the middle case 11M and the outer peripheral surface of the right and left partition wall 45 are exposed to the outside except for the portion that forms the breather chamber 41. The peripheral surfaces of the first cylindrical wall 43 and the second cylindrical wall 44 and the outer peripheral surface of the right and left partition wall 45 have a pair of overhang portions 101 and 102 that overhang, in the radial direction, from both the ends thereof in the axial direction.

A square-cylindrical shaped strainer container 105 is formed in diagonally below and in front of the first cylindrical wall 43, the second cylindrical wall 44, and the right and left partition wall 45. The strainer container 105 is formed by the outer peripheral surfaces of the first cylindrical wall 43, the second cylindrical wall 44, the right and left partition wall 45, a rear wall 100 (refer to FIG. 11) formed in the lower portions of these outer peripheral surfaces, a bottom wall 103 that extends from the lower portion of the rear wall 100, a top wall 104 that extends forward from the middle portions of these outer peripheral surfaces, and the pair of overhang portions 101 and 102. The strainer container 105 contains a strainer 71 (described in more detail below). The pair of overhang portions 101 and 102, the bottom wall 103, and the top end surface of the top wall 104 that form the strainer container 105 also form a cover member fixing portion 105*b* and form an outer edge of a front opening 105*a* that faces outwardly in the horizontal direction of the middle case 11M and opens forward. If the front opening 105*a* is closed using a cover member 72 that allows the electric oil pump 70 to be attached thereto and, subsequently, oil is loaded, the level of the oil (indicated by a reference symbol "H" in FIG. 2) is set so that the lower ends of the rotor 15A of the first electric motor 2A and the rotor 15B of the second electric motor 2B do not go under the oil. At that time, a substantially lower half of the strainer container 105 is filled with the oil and serves as a reservoir. That is, the front opening 105*a* is formed at a position so as to overlap the reservoir of the strainer container 105, and the cover member 72 forms the wall surface of the reservoir.

The overhang portion 102 that constitutes the strainer container 105 has through-holes 107*a* and 107*b* serving as a left middle communication passage that allow the left reservoir portion RL to communicate with the strainer container 105. The overhang portion 101 that also constitutes the strainer container 105 has two through-holes (not illustrated) serving as a right middle communication passage that allow the right reservoir portion RR to communicate with the strainer container 105. Thus, the left reservoir portion RL communicates with the right reservoir portion RR via a first left and right communication passage FP. The first left and right communication passage FP is formed from the through-holes 107*a* and 107*b* serving as the left middle communication passage, the strainer container 105, and the two through-holes that correspond to the through-holes 107*a* and 107*b* and that serve as the right middle communication passage.

The rear wall 100 located at a lower position has a drain passage 111 formed therein. One end of the drain passage 111 faces the strainer container 105, and the drain passage 111 passes through the rear wall 100 in the front-read direction. The other end of the drain passage 111 on the rear side forms a drainage port (not illustrated). The drainage port is closed by a drain bolt (not illustrated). By removing the drain bolt, the oil is drained to the outside. In addition, the rear wall 100 located at a lower position has a second left and right communication passage SP formed therein. The second left and right communication passage SP allows the left reservoir portion RL to communicate with the right reservoir portion RR. Accordingly, the second left and right communication passage SP is formed so as to be parallel to the first left and right communication passage FP that is formed so as to include the strainer container 105.

Figure 6:
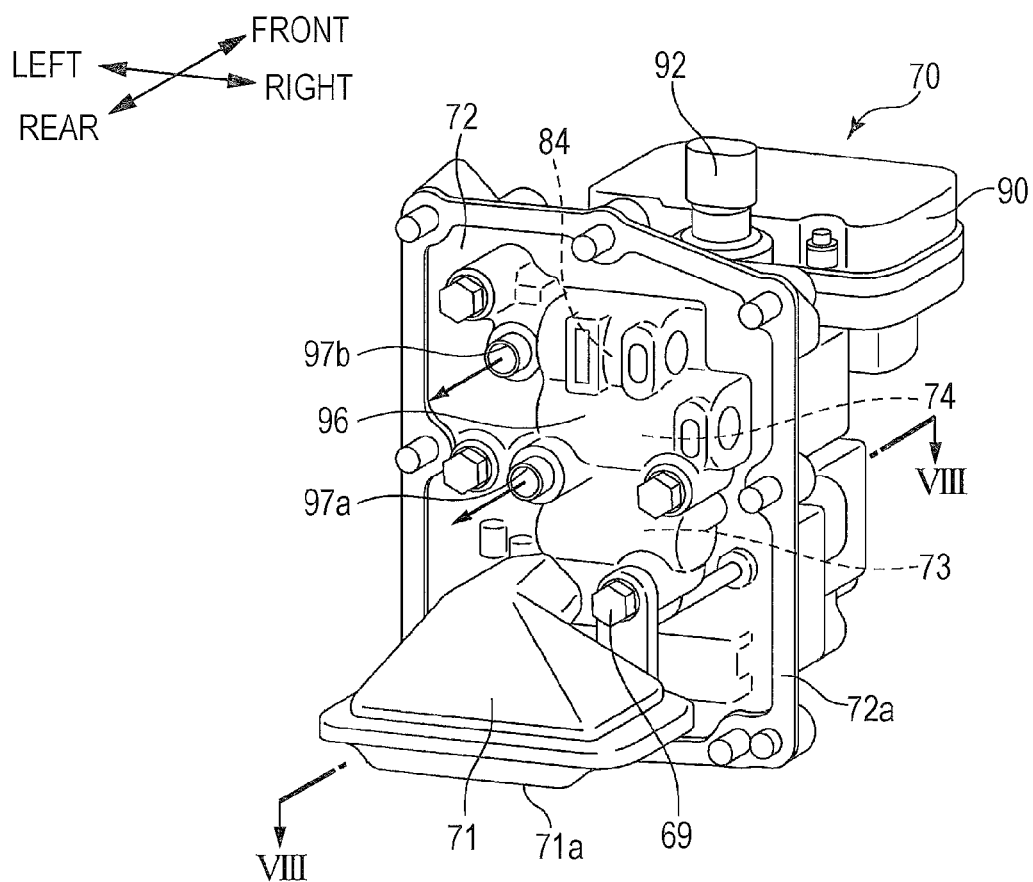
FIG. 6 is a perspective view of a cover member having an electric oil pump and a strainer attached thereto when viewed from the inside.
Figure 7:
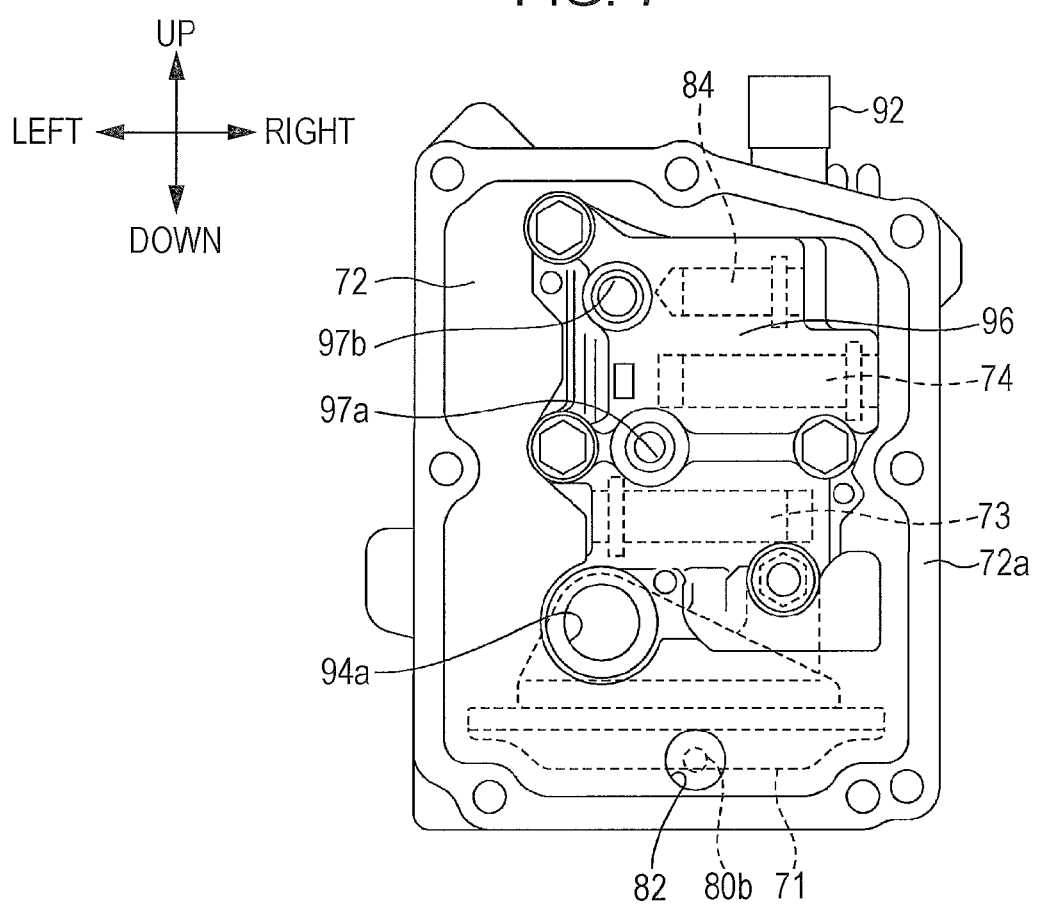
FIG. 7 is a view of the cover member with the strainer removed when viewed from the inside.

As illustrated in FIGS. 6 and 7, the cover member 72 that constitutes part of the case 11 has a case fixing portion 72a having a substantially rectangular end face corresponding to the cover member fixing portion 105b. In addition, the cover member 72 has a strainer insertion hole 94a and a sensor insertion hole 82 formed therein by drilling at positions inside of the case fixing portion 72a. The strainer insertion hole 94a allows the strainer 71 (described below) to be inserted thereinto. The sensor insertion hole 82 allows an oil sensor 80 that detects the temperature of the oil to be inserted thereinto. The two holes allow the inside of the case 11 to communicate with the outside. By forming the sensor insertion hole 82 in the substantially middle of the cover member 72 in the vehicle width direction, the oil sensor 80 inserted into and disposed in the sensor insertion hole 82 is located in the substantially middle of the first left and right communication passage FP in the vehicle width direction.

The strainer 71 is inserted into the strainer insertion hole 94a of the cover member 72 from the inside (the rear side) and is fastened together using a bolt 69 that fastens an oil passage forming cover 96 (described below) to the cover member 72. In this manner, the strainer 71 is fixed so as to be removable from only the cover member 72. The strainer 71 contains a filtering material (not illustrated). Thus, the filtering material removes foreign substance in the oil drawn through an intake port 71a formed in the bottom surface of the strainer 71. After foreign substance is removed, the oil is delivered to the electric oil pump 70. That is, an inner side liquid passage of an oil intake path 94 that extends from the inside of the case 11 to the outside for supplying the oil to the electric oil pump 70 is formed by the strainer 71 fixed to the cover member 72. The inner side liquid passage extends from the strainer insertion hole 94a to the intake port 71a.

Figure 8:
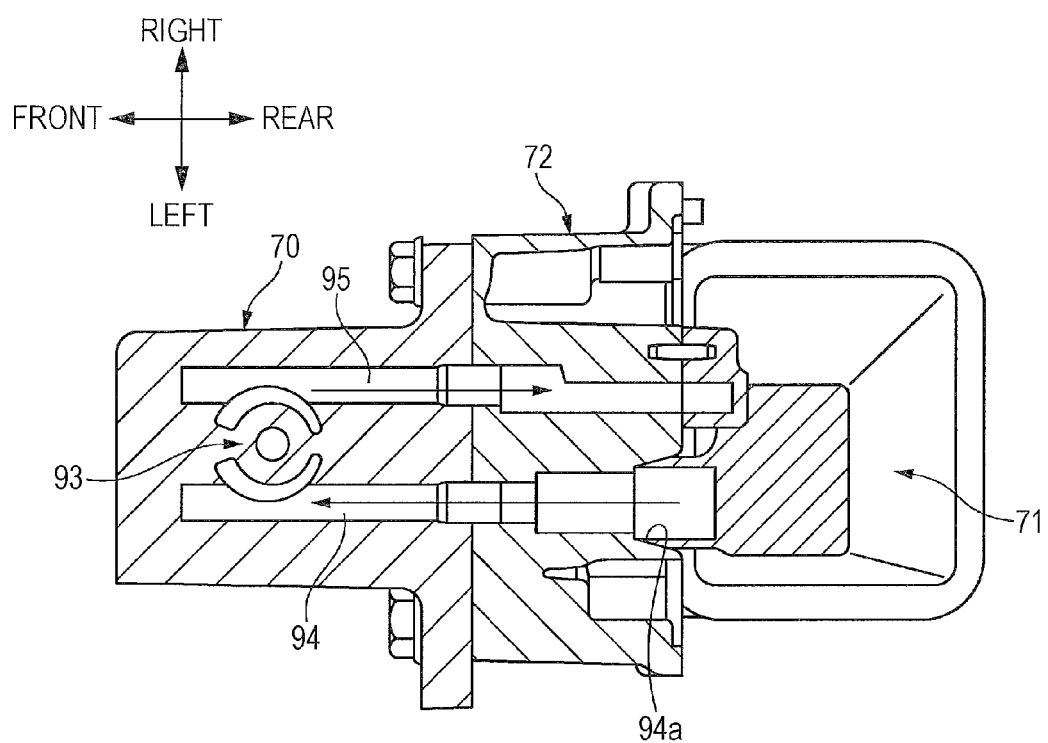
FIG. 8 is a cross-sectional view of the electric oil pump taken along a line VIII-VIII of FIG. 6.

The strainer 71 that forms the oil intake path 94 together with the electric oil pump 70 and the cover member 72 extends inwardly beyond the case fixing portion 72a of the cover member 72. The intake port 71a of the strainer 71 is located inside the reservoir of the strainer container 105 that constitutes the first left and right communication passage FP when the cover member 72 is attached and fixed to the case 11. As illustrated in FIG. 8, an oil ejection passage 95 is formed in the electric oil pump 70 and the cover member 72 in parallel to the oil intake path 94. The oil ejection passage 95 supplies the oil from the electric oil pump 70 to the first and second electric motors 2A and 2B and the first and second planetary gear reducers 12A and 12B.

The outer side surface of the cover member 72 has a sensor containing space SS (refer to FIG. 11, FIGS. 12A and 12B, and FIGS. 13A and 13B) that concaves rearward at a position lower than the oil intake path 94 and the oil ejection passage 95. That is, the sensor containing space SS is formed so that a base portion 87 extends toward the electric oil pump 70 beyond the upper portion of the sensor insertion hole 82 of the cover member 72. A flange portion 88 of the electric oil pump 70 is in contact with the base portion 87 and is fixed to the base portion 87. In the sensor containing space SS, the oil sensor 80 that detects the temperature of the oil is fixed to the cover member 72 from the outer side (the front side) using a bolt 89. A sensor base portion 80a of the oil sensor 80 is exposed to the outside through the cover member 72. A temperature taking unit 80b disposed at the top end passes through the sensor insertion hole 82 and is located in the strainer container 105. That is, the oil sensor 80 is disposed inside the reservoir of the strainer container 105 that constitutes the first left and right communication passage FP.

Figure 11:
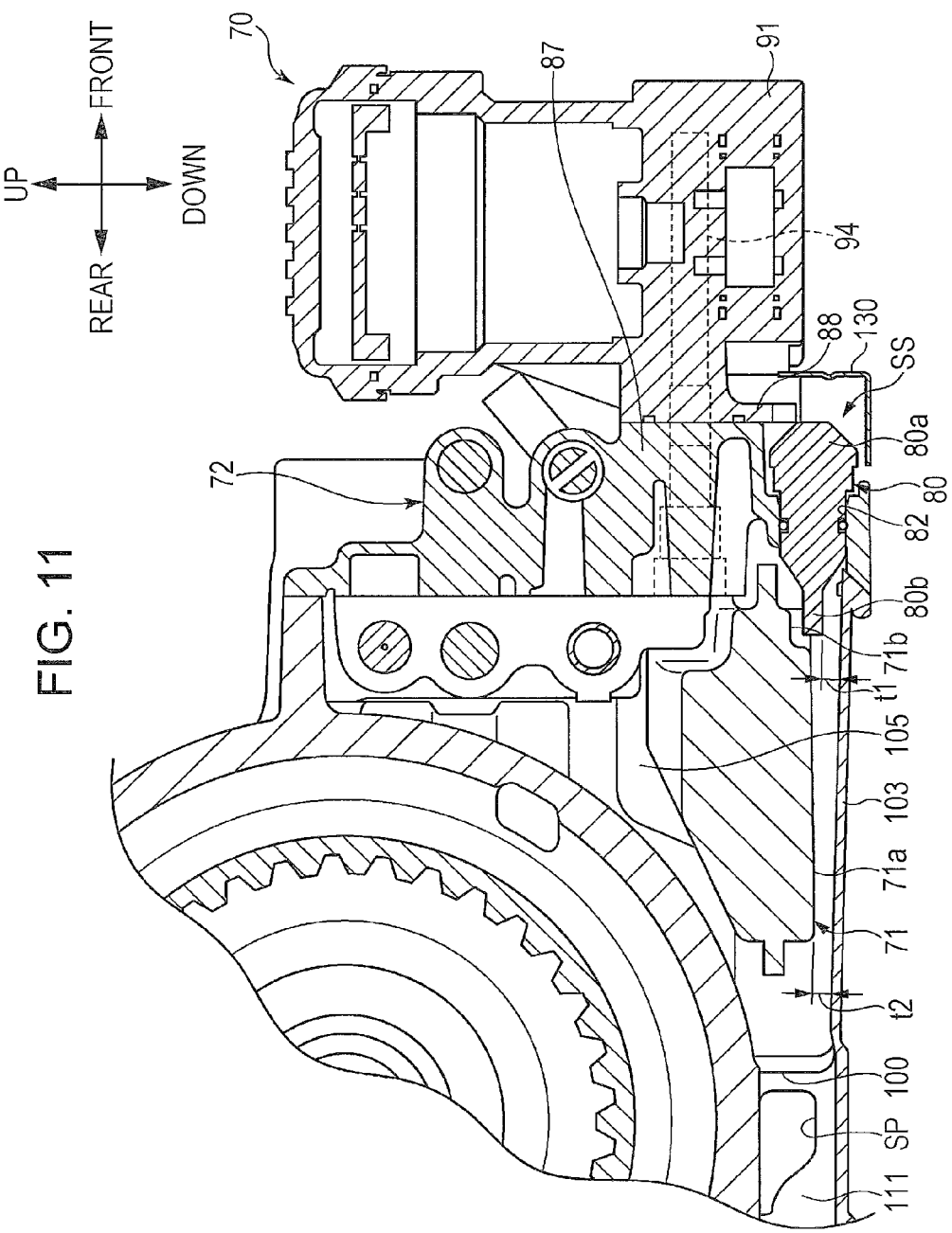
FIG. 11 is a partial cross-sectional view of the rear drive apparatus cut by a vertical plane that passes through an oil sensor.
Figure 12A:
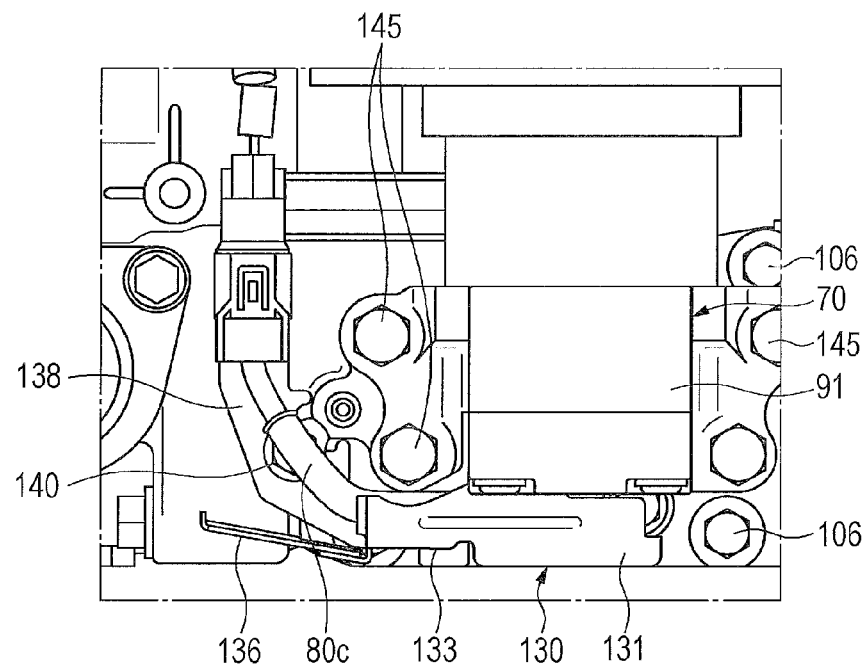
FIG. 12A is a front view of the oil sensor with a sensor cover attached and its vicinity.
Figure 12B:
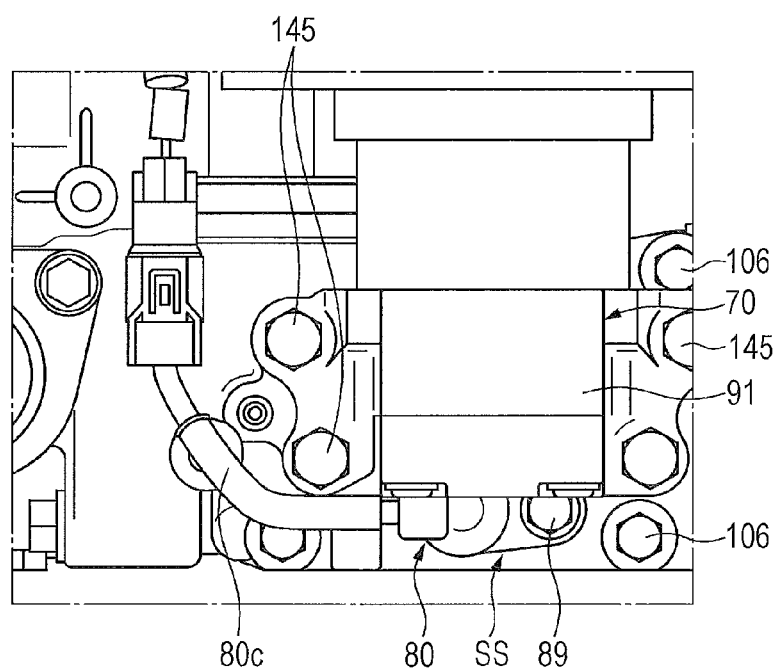
FIG. 12B is a front view of the oil sensor with a sensor cover removed and its vicinity.
Figure 13A:
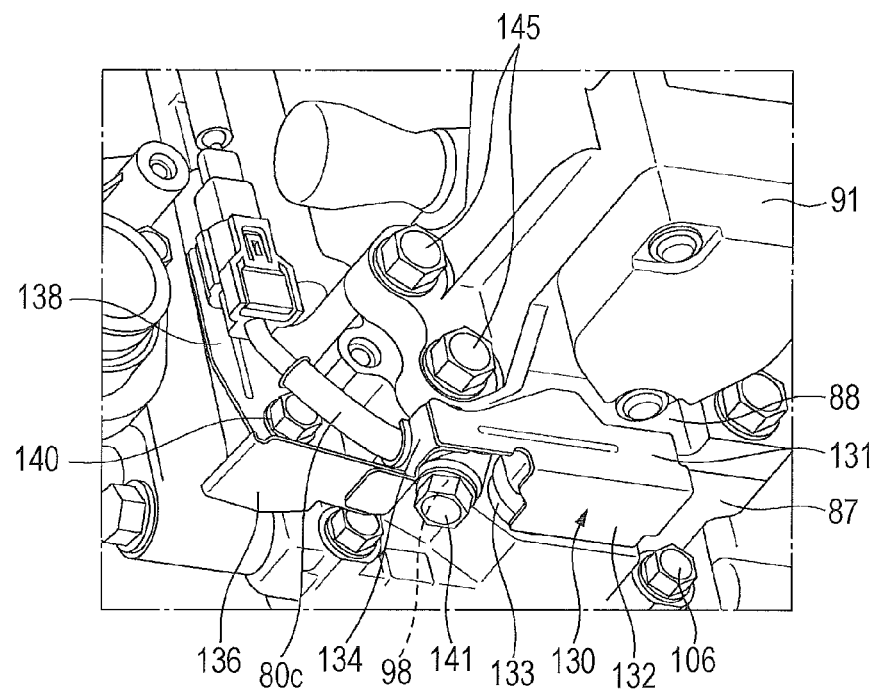
FIG. 13A is a perspective view of the oil sensor with a sensor cover attached and its vicinity.
Figure 13B:
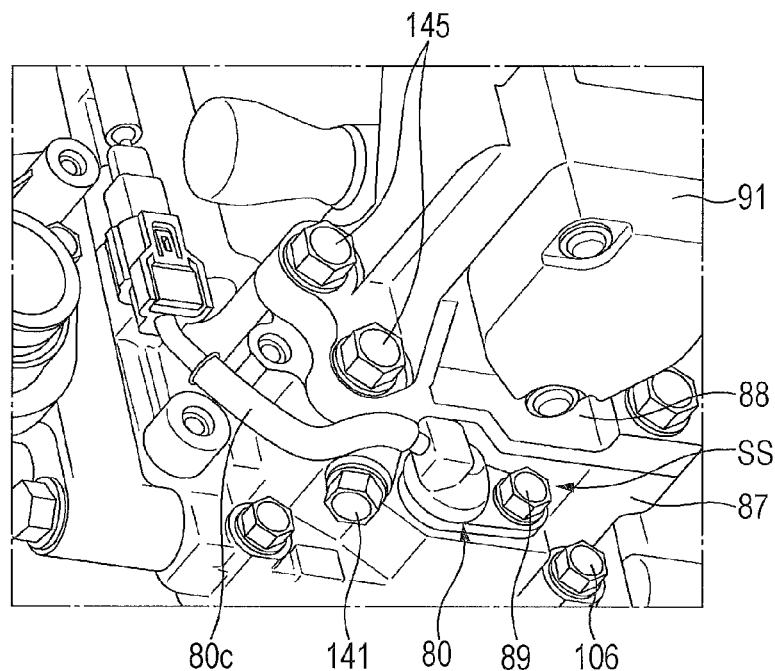
FIG. 13B is a perspective view of the oil sensor with a sensor cover removed and its vicinity.
Figure 14:
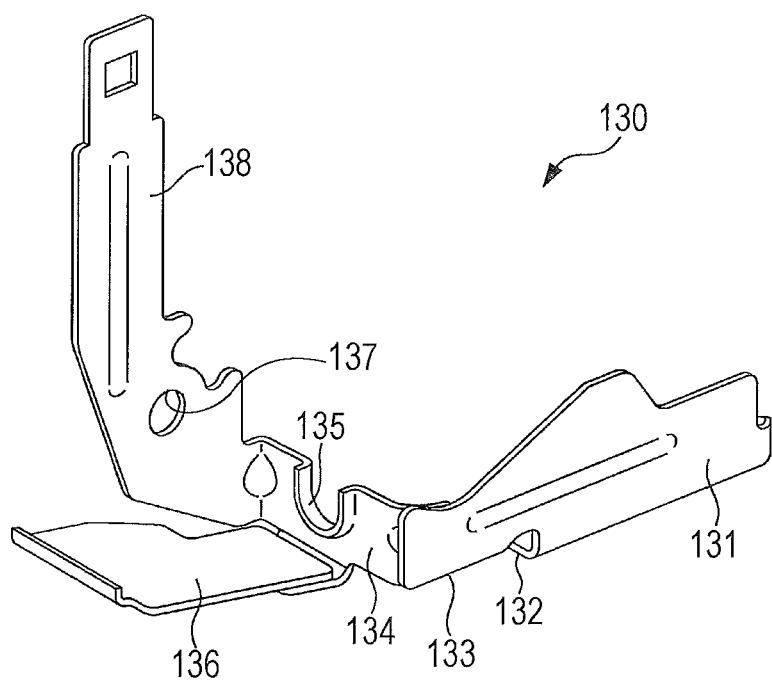
FIG. 14 is a perspective view of the sensor cover.

As illustrated in FIG. 11, the temperature taking unit 80b of the oil sensor 80 is located in the strainer container 105. At that time, part of the temperature taking unit 80b is positioned in a lower portion of the strainer 71 and inside a concave portion 71b formed in a front portion of the bottom surface of the strainer 71. In addition, the temperature taking unit 80b is disposed in the vicinity of the intake port 71a formed in the bottom surface of the strainer 71. Furthermore, a distance t1 between the lowermost portion of the temperature taking unit 80b of the oil sensor 80 and the bottom wall 103 of the reservoir is substantially the same as a distance t2 between the lowermost portion of the intake port 71a and the bottom wall 103 of the reservoir.

If each of the intake port 71a and the temperature taking unit 80b is too close to the bottom wall 103, there is a risk of the intake port 71a and the temperature taking unit 80b easily interfering with the bottom wall 103. In addition, the resistance may increase and, thus, the intake performance may be decreased. Furthermore, the temperature taking unit 80b is easily affected by the temperature of the bottom wall 103. In contrast, if each of the strainer 71 and the temperature taking unit 80b is too far from the bottom wall 103, the strainer 71 and the temperature taking unit 80b may be exposed above the oil level. However, by attaching the oil sensor 80 and the strainer 71 to the cover member 72 in advance, positional offset of each of the strainer 71 and the temperature taking unit 80b from the bottom wall 103 negligibly occurs and, thus, the strainer 71 and the temperature taking unit 80b can be disposed at appropriate positions.

In this manner, the oil sensor 80 is fixed to the outer side of the cover member 72, and the strainer 71 is fixed to the inner side of the cover member 72. In addition, the oil sensor 80 and the strainer 71 are disposed so as to overlap each other when viewed in the vertical direction and when viewed in the horizontal direction. As illustrated in FIG. 7, the strainer 71 and the oil sensor 80 are formed so as to be fit into an outer edge projection area defined by projecting the case fixing portion 72a of the cover member 72 when viewed in the front-rear direction.

As illustrated in FIG. 11, the intake port 71a of the strainer 71 is closer to the central portion of the reservoir than the oil sensor 80 when viewed in the vertical direction. A variation of the oil level in the central portion of the reservoir is relatively smaller than that in the peripheral portion. Accordingly, by disposing the strainer 71 in the vicinity of the central portion, ventilation can be prevented. Note that like the intake port 71a, it is not desirable that the oil sensor 80 be exposed above the oil surface. Accordingly, the oil sensor 80 is disposed in the vicinity of the bottom wall 103. However, a resistance of the oil sensor 80 to exposure is higher than that of the intake port 71a.

As illustrated in FIG. 5, the electric oil pump 70 is attached to the cover member 72 by a plurality of bolts 145 so as to be located on the front side of the cover member 72. At that time, the flange portion 88 is in contact with the base portion 87 on the outer side of the cover member 72. In addition, the case fixing portion 72a formed in the cover member 72 is attached to the cover member fixing portion 105b formed in the front opening 105a of the strainer container 105 using a plurality of bolts 106. Thus, the electric oil pump 70 is attached to the strainer container 105 in front of the strainer container 105. As illustrated in FIG. 11, the outermost end (the front end) of the base portion 87 is located at substantially the same position as the outermost end of the sensor base portion 80a that is attached. Note that the outermost end of the base portion 87 may be located on the outer side (the front side) of the outermost end of the sensor base portion 80a. By allowing the base portion 87 to extends forward in this manner, the base portion 87 can cover above the oil sensor 80.

When the flange portion 88 of the electric oil pump 70 is fixed to the base portion 87, the lower end of the flange portion 88 is located below the upper end of the sensor base portion 80a. Thus, when the electric oil pump 70 is attached to the case 11, the flange portion 88 covers the front upper portion of the sensor base portion 80a. In addition, the lower end of the pump case 91 of the electric oil pump 70 is located below the upper end of the sensor base portion 80a. Thus, the pump case 91 covers the front upper portion of the sensor base portion 80a.

In addition, a sensor cover 130 that covers the front portion and the lower portion of the sensor base portion 80a is attached to the case 11 using a bolt 140. As illustrated in FIGS. 11 to 14, a front wall 131 of the sensor cover 130 extends upward so as to overlap the flange portion 88 when viewed in the horizontal direction, and the front wall 131 is disposed on the outer side (the front side) of the flange portion 88 and on the inner side (the rear side) of a pump case 91. A bottom wall 132 of the sensor cover 130 is bent from the front wall 131 and extends rearward so as to be substantially perpendicular to the front wall 131. A notch 133 is formed in the bottom wall 132 that covers the lower part of the sensor base portion 80a such that the bottom wall 132 avoids a pressure taking closing bolt 141 that is located below the base portion 87 and that closes a line pressure detection hole 98. Accordingly, when the pressure is measured, the pressure taking closing bolt 141 can be tightened and loosened with the electric oil pump 70 and the sensor cover 130 attached. The sensor cover 130 has a side wall 134 that is perpendicular to the front wall 131 and the bottom wall 132. The side wall 134 has a concave groove 135 formed therein. The concave groove 135 holds a sensor cable 80c on the side wall 134. A protection plate 136 extends from the side wall 134 under the sensor cable 80c held by the concave groove 135. In addition, a fixed plate 138 extends from the side wall 134 in a standing manner. The fixed plate 138 has a bolt hole 137 formed therein by drilling. The bolt hole 137 allows the bolt 140 used for attaching the sensor cover 130 to pass therethrough.

Figure 10:
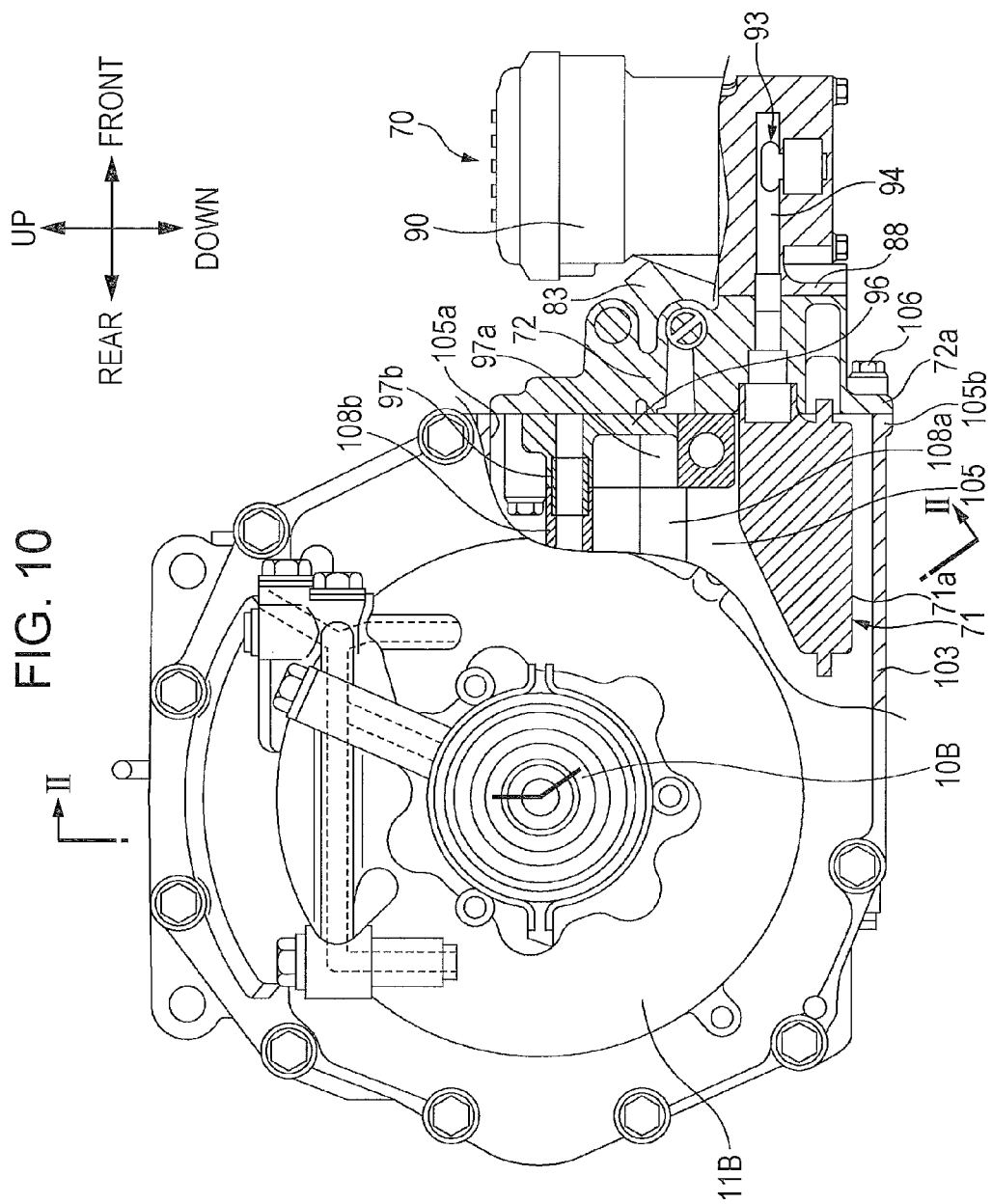
FIG. 10 is a partial cross-sectional view of the rear drive apparatus cut by a vertical plane that passes through an oil intake passage.

Referring back to FIGS. 6 and 7, the oil passage forming cover 96 is fixed to the inner surface of the cover member 72 using the bolt 69. The oil passage forming cover 96 defines part of an oil passage that communicates with the electric oil pump 70 of an oil pressure circuit 99 (described below) together with the cover member 72. A low-pressure oil passage changeover valve 73, a brake oil passage changeover valve 74, and a relief valve 84 are disposed from below in this order between the cover member 72 and the oil passage forming cover 96. As illustrated in FIG. 10, a solenoid valve 83 is attached to the opposite side of the cover member 72 from the oil passage forming cover 96. By applying electric power to the solenoid valve 83, a pilot oil passage 81 (described in more below) disposed between the low-pressure oil passage changeover valve 73 and the brake oil passage changeover valve 74 is opened or closed.

The electric oil pump 70 is a so-called trochoid pump. The electric oil pump 70 is driven by an electric motor 90 formed as a position sensorless brushless DC motor. The electric oil pump 70 can operate in the following at least two modes: a high pressure mode and a low pressure mode. The electric oil pump 70 is controlled under proportional-integral-derivative (PID) control. The electric oil pump 70 rotates an inner rotor or an outer rotor (neither is illustrated) provided in a suction unit 93 illustrated in FIG. 8 so as to control the discharge rate. In this manner, the electric oil pump 70 discharges oil drawn from the strainer 71 to the oil intake path 94 provided in the electric oil pump 70 and the cover member 72 to the oil ejection passage 95 provided in the electric oil pump 70 and the cover member 72.

As illustrated in FIGS. 6, 7, and 10, the oil passage forming cover 96 has two exit pipes 97a and 97b attached thereto in the strainer container 105. The exit pipes 97a and 97b are connected to a working chamber port 108a of a brake oil passage 77 (described below) formed in the outer peripheral surface of the middle case 11M in the strainer container 105 and a cooling/lubricating port 108b of the first and second planetary gear reducers 12A and 12B of the first and second electric motors 2A and 2B, respectively.

As described above, the exit pipes 97a and 97b are connected to the working chamber port 108a and the cooling/lubricating port 108b, respectively, when the cover member 72 having the electric oil pump 70 attached thereto is attached to the front opening 105a of the strainer container 105. In addition, at the same time, the front opening 105a formed at a position at which the front opening 105a overlaps the reservoir of the strainer container 105 is closed by the cover member 72, and an inner wall of the cover member 72 including the oil passage forming cover 96 forms the wall surface of the strainer container 105.

In addition, the case 11 has the brake oil passage 77 (refer to FIG. 15), a front vertical oil passage 109, and front horizontal oil passages 110A and 110B formed therein. The brake oil passage 77 allows the working chamber port 108a to communicate with the working chamber S. The front vertical oil passage 109 vertically extends from the cooling/lubricating port 108b in the front portion of the middle case 11M. The front horizontal oil passages 110A and 110B branch from the front vertical oil passage 109 to the right and left and extend horizontally in front of the left side case 11A, the right side case 11B, and the middle case 11M. In this manner, oil can be supplied to the first and second electric motors 2A and 2B. In addition, oil can be supplied to the first and second planetary gear reducers 12A and 12B via the axle shafts 10A and 10B, respectively.

Figure 15:
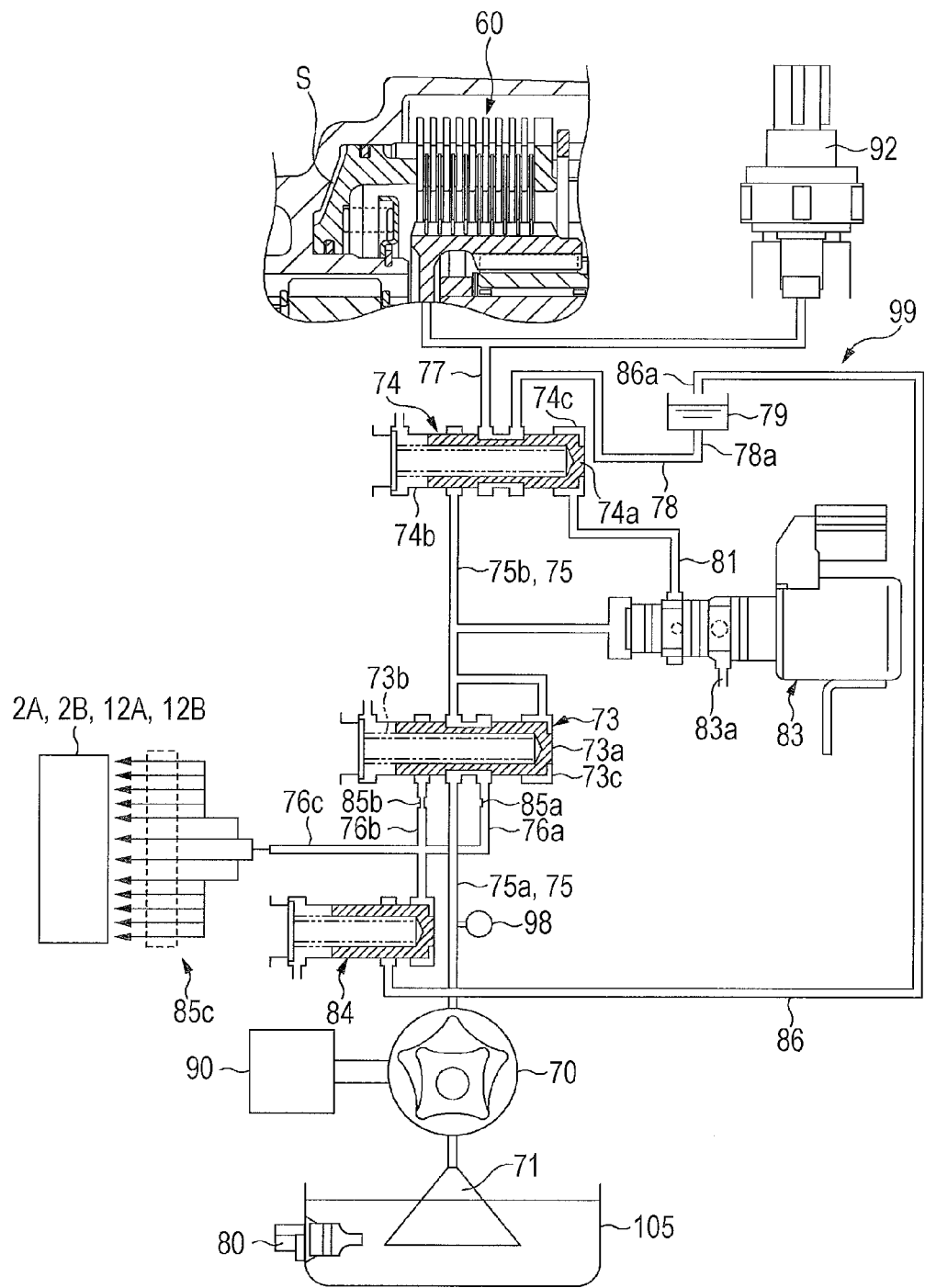
FIG. 15 is an oil pressure circuit diagram of the rear drive apparatus for cooling and/or lubricating, for example, an electric motor of the rear drive apparatus.

The oil pressure circuit 99 is described below with reference to FIG. 15. The oil pressure circuit 99 cools the above-described first and second electric motors 2A and 2B and/or lubricates the first and second electric motors 2A and 2B with oil. In addition, the oil pressure circuit 99 lubricates the first and second planetary gear reducers 12A and 12B with oil.

The oil pressure circuit 99 can supply oil, which is drawn from the strainer 71 disposed in the strainer container 105 and is discharged from the electric oil pump 70, to the working chamber S of the hydraulic brake 60 via the low-pressure oil passage changeover valve 73 and the brake oil passage changeover valve 74. In addition, the oil pressure circuit 99 can supply the oil to parts of the first and second electric motors 2A and 2B and the first and second planetary gear reducers 12A and 12B that need lubrication and cooling (hereinafter also referred to as "lubricated and cooled parts") via the low-pressure oil passage changeover valve 73. Note that the oil pressure circuit 99 includes a sensor 92 for detecting, for example, the oil pressure in the brake oil passage 77.

The low-pressure oil passage changeover valve 73 is connected to a first line oil passage 75*a* that constitutes a line oil passage 75 and that is located on the side of the electric oil pump 70, a second line oil passage 75*b* that constitutes the line oil passage 75 and that is located on the side of the brake oil passage changeover valve 74, a first low-pressure oil passage 76*a* that communicates with the lubricated and cooled parts, and a second low-pressure oil passage 76*b* that communicates with the lubricated and cooled parts. In addition, the low-pressure oil passage changeover valve 73 includes a valving element 73*a*, a spring 73*b*, and an oil chamber 73*c*. The valving element 73*a* allows the first line oil passage 75*a* to communicate with the second line oil passage 75*b* at all times. In addition, the valving element 73*a* allows the line oil passage 75 to selectively communicate with one of the first low-pressure oil passage 76*a* and the second low-pressure oil passage 76*b*. The spring 73*b* urges the valving element 73*a* in a direction in which the line oil passage 75 communicates with the first low-pressure oil passage 76*a* (the right direction in FIG. 15). The oil chamber 73*c* presses the valving element 73*a* in a direction in which the line oil passage 75 communicates with the second low-pressure oil passage 76*b* (the left direction in FIG. 15) using the oil pressure in the line oil passage 75. Accordingly, the valving element 73*a* is urged by the spring 73*b* in the direction in which the line oil passage 75 communicates with the first low-pressure oil passage 76*a* (the right direction in FIG. 15). In addition, the valving element 73*a* is pressed by the oil pressure in the line oil passage 75 input to the oil chamber 73*c* located at the right end in FIG. 15 in a direction in which the line oil passage 75 communicates with the second low-pressure oil passage 76*b* (the left direction in FIG. 15).

At that time, the urging force of the spring 73*b* is set so that during the operation of the electric oil pump 70 in a low pressure mode, the valving element 73*a* does not move against the oil pressure of the line oil passage 75 input to the oil chamber 73*c* and, thus, the line oil passage 75 is blocked from the second low-pressure oil passage 76*b* and communicates with the first low-pressure oil passage 76*a* (hereinafter the position of the valving element 73*a* is referred to as a "low-pressure side position"). In contrast, during the operation of the electric oil pump 70 in a high pressure mode, the oil pressure of the line oil passage 75 input to the oil chamber 73*c* causes the valving element 73*a* to move so that the line oil passage 75 is blocked from the second low-pressure oil passage 76*b* and communicates with the second low-pressure oil passage 76*b* (hereinafter the position of the valving element 73*a* is referred to as a "high-pressure side position").

The brake oil passage changeover valve 74 is connected to the second line oil passage 75*b* that constitutes the line oil passage 75, the brake oil passage 77 connected to the hydraulic brake 60. In addition, the brake oil passage changeover valve 74 is connected to an oil reservoir 79 via a high position drain 78. Furthermore, the brake oil passage changeover valve 74 includes a valving element 74*a*, a spring 74*b*, and an oil chamber 74*c*. The valving element 74*a* allows the second line oil passage 75*b* to communicate with the brake oil passage 77 or closes off the second line oil passage 75*b* from the brake oil passage 77. The spring 74*b* urges the valving element 74*a* in a direction in which the second line oil passage 75*b* is blocked from the brake oil passage 77 (the right direction in FIG. 15). The oil chamber 74*c* presses the valving element 74*a* in a direction in which the second line oil passage 75*b* communicates with the brake oil passage 77 (the left direction in FIG. 15) using the oil pressure in the line oil passage 75. Accordingly, the valving element 74*a* is urged by the spring 74*b* in the direction in which the second line oil passage 75*b* is blocked from the brake oil passage 77 (the right direction in FIG. 15). In addition, the valving element 74*b* can be pressed by the oil pressure in the line oil passage 75 input to the oil chamber 74*c* in a direction in which the second line oil passage 75*b* communicates with the brake oil passage 77 (the left direction in FIG. 15).

The urging force of the spring 74*b* is set so that during the operation of the electric oil pump 70 in the low pressure mode and the high pressure mode, the valving element 74*a* is moved from a valve open position to a valve closed position by the oil pressure in the line oil passage 75 input to the oil chamber 74*c* and, thus, the brake oil passage 77 is blocked from the high position drain 78 and communicates with the second line oil passage 75*b*. That is, even when the electric oil pump 70 operates in the low pressure mode or the high pressure mode, the oil pressure in the line oil passage 75 input to the oil chamber 74*c* is greater than the urging force of the spring 74*b* and, thus, the brake oil passage 77 is blocked from the high position drain 78 and is allowed to communicate with the second line oil passage 75*b*.

When the second line oil passage 75*b* is blocked from the brake oil passage 77, the hydraulic brake 60 communicates with the oil reservoir 79 via the brake oil passage 77 and the high position drain 78. At that time, the oil reservoir 79 is disposed at a position higher than the strainer container 105 in the vertical direction. More preferably, the uppermost portion of the oil reservoir 79 in the vertical direction is located at a position higher than the middle point between the uppermost portion of the working chamber S and the lowermost portion of the working chamber S of the hydraulic brake 60 in the vertical direction. Accordingly, when the brake oil passage changeover valve 74 is closed, the oil reserved in the working chamber S of the hydraulic brake 60 is not directly discharged to the strainer container 105. The oil is discharged to the oil reservoir 79 and is stored. Note that the oil spilled over the oil reservoir 79 is discharged to the strainer container 105. In addition, a reservoir-side end portion 78*a* of the high position drain 78 is connected to the bottom surface of the oil reservoir 79.

The oil chamber 74*c* of the brake oil passage changeover valve 74 is connectable to the second line oil passage 75*b* that constitutes the line oil passage 75 via the pilot oil passage 81 and the solenoid valve 83. The solenoid valve 83 is formed from an electromagnetic three-way valve that is controlled by an ECU (not illustrated). If the solenoid valve 83 is not powered on by the ECU, the second line oil passage 75*b* is connected to the pilot oil passage 81 and, thus, the oil pressure in the line oil passage 75 is input to the oil chamber 74*c*.

In contrast, if the solenoid valve 83 is powered on, the oil stored in the oil chamber 74*c* is discharged to the strainer container 105 via a discharge oil passage 83*a*. Thus, the second line oil passage 75*b* is blocked from the pilot oil passage 81.

In addition, in the oil pressure circuit 99, the first low-pressure oil passage 76*a* and the second low-pressure oil passage 76*b* merge into a low-pressure common oil passage 76*c* on a downstream side. The relief valve 84 is connected to a portion at which the first low-pressure oil passage 76*a* and the second low-pressure oil passage 76*b* merge. If the line pressure in the low-pressure common oil passage 76*c* is a predetermined pressure or higher, the relief valve 84 discharges the oil in the low-pressure common oil passage 76c to the oil reservoir 79 through a relief drain 86 and decreases the oil pressure. Note that an oil reservoir-side end portion 86a of the relief drain 86 is disposed at a position higher than the uppermost portion of the oil reservoir 79 in the vertical direction.

The first low-pressure oil passage 76a and the second low-pressure oil passage 76b have orifices 85a and 85b formed therein, respectively. Each of the orifices 85a and 85b serves as a liquid passage resistance unit. The diameter of the orifice 85a of the first low-pressure oil passage 76a is greater than the diameter of the orifice 85b of the second low-pressure oil passage 76b. Accordingly, the liquid flow resistance of the second low-pressure oil passage 76b is greater than that of the first low-pressure oil passage 76a. Therefore, the amount of decompression in the second low-pressure oil passage 76b during the operation of the electric oil pump 70 in the high pressure mode is greater than that in the first low-pressure oil passage 76a during the operation of the electric oil pump 70 in the low pressure mode. Thus, the oil pressure in the low-pressure common oil passage 76c during the high pressure mode is substantially the same as during the low pressure mode.

In this manner, during the operation of the electric oil pump 70 in the low pressure mode, in the low-pressure oil passage changeover valve 73 connected to the first low-pressure oil passage 76a and the second low-pressure oil passage 76b, the urging force of the spring 73b is greater than the oil pressure in the oil chamber 73c and, therefore, the valving element 73a is located at the low-pressure side position. Thus, the low-pressure oil passage changeover valve 73 closes off the line oil passage 75 from the second low-pressure oil passage 76b and allows the line oil passage 75 to communicate with the first low-pressure oil passage 76a. The oil flowing through the first low-pressure oil passage 76a is subjected to a liquid flow resistance at the orifice 85a and, thus, the oil pressure is reduced. Thereafter, the oil flows through the low-pressure common oil passage 76c and reaches the lubricated and cooled parts. In contrast, during the operation of the electric oil pump 70 in the high pressure mode, the oil pressure in the oil chamber 73c is greater than the urging force of the spring 73b and, thus, the valving element 73a is located at the high-pressure side position against the urging force of the spring 73b. In this manner, the low-pressure oil passage changeover valve 73 closes off the line oil passage 75 from the first low-pressure oil passage 76a and allows the line oil passage 75 to communicate with the second low-pressure oil passage 76b. The oil flowing through the second low-pressure oil passage 76b is subjected to a liquid flow resistance at the orifice 85b that is higher than at the orifice 85a and, thus, the oil pressure is reduced. Thereafter, the oil flows through the low-pressure common oil passage 76c and reaches the lubricated and cooled parts.

Accordingly, if the electric oil pump 70 is switched from the low pressure mode to the high pressure mode, the oil passage having a small liquid flow resistance is automatically switched to the oil passage having a large liquid flow resistance in accordance with a variation in the oil pressure in the line oil passage 75. Thus, during the high pressure mode, supply of excess oil to the lubricated and cooled parts can be prevented.

In addition, an oil passage from the low-pressure common oil passage 76c to the lubricated and cooled parts has a plurality of orifices 85c serving as the other liquid passage resistance units. The plurality of orifices 85c are set so that the smallest passage cross-sectional area of the orifice 85a of the first low-pressure oil passage 76a is smaller than the smallest passage cross-sectional area of the orifice 85c. That is, the setting is made so that the liquid flow resistance of the orifice 85a of the first low-pressure oil passage 76a is higher than the liquid flow resistance of the plurality of orifices 85c. At that time, the smallest passage cross-sectional area of the orifices 85c is the sum of the smallest passage cross-sectional areas of the plurality of orifices 85c. In this manner, a desired flow volume can be adjustably obtained using the orifice 85a of the first low-pressure oil passage 76a and the orifice 85b of the second low-pressure oil passage 76b.

The line oil passage 75 has the line pressure detection hole 98 closed by the pressure taking closing bolt 141 between the electric oil pump 70 and the low-pressure oil passage changeover valve 73. By removing the pressure taking closing bolt 141 through the notch 133 of the sensor cover 130, the oil pressure in the first line oil passage 75a can be detected with the electric oil pump 70 and the sensor cover 130 attached.

As described above, according to the rear drive apparatus 1 of the present embodiment, the cover member 72 has the strainer insertion hole 94a and the sensor insertion hole 82 that allow the inside of the cover member 72 to communicate with the outside when the cover member 72 is mounted. The oil sensor 80 is inserted into the sensor insertion hole 82 and is fixed to the cover member 72. In addition, one end of the strainer insertion hole 94a at which the intake port 71a that draws oil is formed is disposed in the reservoir, and the strainer insertion hole 94a forms part of the oil intake path 94 that extends from the inside to the outside of the case 11. In addition, a flow path from the strainer insertion hole 94a of the oil intake path 94 to the intake port 71a is formed by the strainer 71 fixed to the cover member 72. In this manner, since the two members, that is, the oil sensor 80 and the strainer 71 are fixed to the cover member 72, the three members can be handled as one body. In an existing structure, since the oil sensor 80 and the strainer 71 are separately fixed, there is a risk of the position of the oil sensor 80 being offset from the position of the strainer 71 and, thus, it is difficult to fix the oil sensor 80 and the strainer 71 in place. However, by fixing the relative positional relationship among the three members and, thereafter, disposing the three members in the reservoir, the occurrence of positional offset can be prevented. While the present exemplary embodiment has been described with reference to oil serving as liquid fluid used for cooling and lubrication, other types of liquid fluid may be employed. In addition, while the present exemplary embodiment has been described with reference to the oil sensor 80 that detects the temperature of oil to serve as the sensor that detects the property of the liquid fluid, the sensor is not limited thereto. For example, an oil sensor that detects the oil viscosity, oil deterioration, or the oil level may be employed.

In addition, since the oil sensor 80 and the strainer 71 are disposed so as to overlap each other when viewed in the vertical direction, the width of the rear drive apparatus 1 in the horizontal direction can be reduced. Furthermore, since the oil sensor 80 and the strainer 71 are disposed so as to overlap each other when viewed in the horizontal direction, the height of the rear drive apparatus 1 in the vertical direction can be reduced. Still furthermore, the intake port 71a and the oil sensor 80 can be disposed at the same height level.

In addition, since the oil sensor 80 is disposed below the strainer 71, a variation of the oil level can be prevented by the strainer 71. Thus, the oil easily stays at a position at which the oil sensor 80 is disposed below the strainer 71. In this manner, the detection accuracy of the oil sensor 80 can be increased.

Furthermore, the strainer 71 has the concave portion 71b at a position at which the strainer 71 faces the oil sensor 80, and at least part of the oil sensor 80 is disposed in the concave portion 71b. Accordingly, the oil sensor 80 can be disposed so as to be closer to the strainer 71 and, thus, the oil sensor 80 and the strainer 71 can be disposed at substantially the same height even when the two members overlap each other when viewed in the vertical direction.

Still furthermore, by disposing the intake port 71a closer to the central portion of the reservoir than the oil sensor 80 when viewed in the vertical direction, intake of air into the intake port 71a having a relatively low tolerance to exposure can be prevented.

Yet still furthermore, the oil sensor 80 and the strainer 71 are disposed so that the distance between the lowermost portion of the temperature taking unit 80b of the oil sensor 80 and the bottom wall 103 of the reservoir is substantially the same as the distance between the lowermost portion of the intake port 71a and the bottom wall 103 of the reservoir, and the temperature taking unit 80b and the intake port 71a are placed at an appropriate distance from the bottom wall 103. Accordingly, contact of the oil sensor 80 and the strainer 71 with the bottom wall 103 when each of the oil sensor 80 and the strainer 71 is mounted can be prevented. In addition, the dead space can be reduced.

Yet still furthermore, the oil sensor 80 is fixed to the outer side of the cover member 72, and the strainer 71 is fixed to the inner side of the cover member 72. That is, the oil sensor 80 and the strainer 71 are separately mounted on the inside and the outside of the cover member 72. Accordingly, interference between the fixing portions of the two members can be prevented.

Yet still furthermore, the front opening 105a closed by the cover member 72 is formed in the front portion, which is a surface facing in the horizontal direction of the case 11, and the cover member 72 is mounted on the front surface facing in the horizontal direction. Thus, the oil sensor 80 can be disposed while avoiding under the case 11. In this manner, damage of the oil sensor 80 from the outside can be prevented. In addition, since the oil sensor 80 is disposed while avoiding above the case 11, a member disposed above the case 11, such as a floor, can be disposed at a lower position.

Yet still furthermore, the oil sensor 80 and the strainer 71 are formed so as to be fit into the outer edge projection area defined when the case fixing portion 72a of the cover member 72 is projected. Accordingly, when the strainer 71 is inserted through the front opening 105a to mount the cover member 72 in the front opening 105a, the two members, that is, the oil sensor 80 and the strainer 71 negligibly interfere with the case 11.

Yet still furthermore, by providing a filter member that filters oil in the strainer 71, the filter member and the cover member 72 can be handled in an integrated fashion. Accordingly, by removing the cover member 72 from the case 11 and, thereafter, removing the strainer 71 from the cover member 72, the filter member can be easily set up or replaced with a new one.

Yet still furthermore, since the electric oil pump 70 that communicates with the strainer insertion hole 94a and supplies oil is fixed to the outer side of the cover member 72, four members (i.e., the oil sensor 80, the strainer 71, the electric oil pump 70, and the cover member 72) can be handled in an integrated fashion.

Yet still furthermore, the low-pressure oil passage changeover valve 73, the brake oil passage changeover valve 74, and the relief valve 84 disposed in the oil pressure circuit 99 that communicates with the electric oil pump 70 are fixed to the cover member 72. Accordingly, the five members (i.e., the oil sensor 80, the strainer 71, the electric oil pump 70, the cover member 72, and the valve member) can be handled in an integrated fashion.

It should be noted that the present disclosure is not limited to the above-described exemplary embodiment. A variety of modifications and improvements can be made as needed. For example, the front drive apparatus 6 may be formed from the electric motor 5 without using the internal-combustion engine 4. In addition, while the exemplary embodiment has been described with reference to an electric motor serving as a motor, a heat engine, such as a combustion engine, or a fluid machine may be employed. Furthermore, a single motor may drive the right and left wheels. Still furthermore, a transmission of a type other than the first and second planetary gear reducers 12A and 12B can be used. Yet still furthermore, the transmission may be removed, and the motor may be directly connected to the wheels.

While the present exemplary embodiment has been described with reference to the first case 11L formed from the left side case 11A and the middle case 11M and the second case 11R formed from the right side case 11B and the middle case 11M, the configuration is not limited thereto. Any configuration including a reservoir that stores oil can be used, even if the first and second electric motors 2A and 2B are not included and even if the first and second planetary gear reducers 12A and 12B are not included. Such a configuration can be applied to, for example, an oil pan.

While the present exemplary embodiment has been described with reference to the oil sensor 80 inserted into the first left and right communication passage FP from the front, the oil sensor 80 may be inserted into the first left and right communication passage FP from the rear, the side, above, or below. However, if the oil sensor 80 is inserted while avoiding the lower portion, the rear drive apparatus 1 can be placed with the bottom surface downward temporarily when the rear drive apparatus 1 is subjected to a maintenance service or assembled. In addition to the strainer insertion hole 94a and the sensor insertion hole 82, the cover member 72 may have a communication hole formed therein that allows the inside to communicate with the outside.

Furthermore, the positional relationship between the oil sensor 80 and the strainer 71 can be changed as appropriate.

According to an embodiment of the present disclosure, a vehicle drive apparatus (e.g., a rear drive apparatus 1 of the embodiment) includes a motor (e.g., the first electric motor 2A and the second electric motor 2B of the embodiment) connected to a wheel (e.g., a left rear wheel Lwr and a right rear wheel Rwr of the embodiment) of a vehicle so that power is transmittable from the motor to the wheel, a case (e.g., a case 11 of the embodiment) including a reservoir (e.g., a strainer container 105 of the embodiment) that stores liquid fluid used for at least one of cooling of the motor, lubrication of the motor, cooling of a power transmission path between the motor and the wheel, and lubrication of the power transmission path, where the case has an opening (e.g., a front opening 105a of the embodiment) that allows an inside thereof to communicate with an outside, a cover member (e.g., a cover member 72 of the embodiment) removably mounted on the opening, the cover member closing the opening when mounted and constituting part of the case, and a liquid fluid sensor (e.g., an oil sensor 80 of the embodiment) that detects the property of the liquid fluid, a detection unit (e.g., a temperature taking unit 80*b* of the embodiment) of the liquid fluid sensor being disposed in the reservoir. The cover member has at least two communication holes (e.g., a strainer insertion hole 94*a* and a sensor insertion hole 82 of the embodiment) that allow the inside of the cover member to communicate with the outside when mounted, and the liquid fluid sensor is inserted into a first communication hole (e.g., the sensor insertion hole 82 of the embodiment) representing one of the two communication holes and is fixed to the cover member. One end of a second communication hole (e.g., the strainer insertion hole 94*a* of the embodiment) representing the other communication hole has an intake port (e.g., an intake port 71*a* of the embodiment) that draws the liquid fluid, and the end of the second communication hole is disposed in the reservoir, and the second communication hole constitutes part of a fluid flow path (e.g., an oil intake path 94 of the embodiment) extending from the inside of the case to the outside. An inside fluid flow path of the fluid flow path from the second communication hole to the intake port is formed from a separate member (e.g., a strainer 71 of the embodiment) fixed to the cover member. In such a configuration of the embodiment, since the two members, that is, the liquid fluid sensor and the separate member are fixed to the cover member, the three members can be handled in an integrated fashion. Accordingly, after the positional relationship among the three members are determined, the three members can be disposed in the reservoir. In this manner, the accuracy of positioning of the liquid fluid sensor and the separate member can be increased.

The liquid fluid sensor and the separate member can be disposed so as to overlap each other when viewed in the vertical direction. In such a configuration of the embodiment, the width in the horizontal direction can be reduced.

The liquid fluid sensor and the separate member can be disposed so as to overlap each other when viewed in the horizontal direction. In such a configuration of the embodiment, the height in the vertical direction can be reduced. In addition, the intake port and the liquid fluid sensor can be disposed at the same height.

The liquid fluid sensor can be disposed under the separate member. In such a configuration of the embodiment, a variation of the oil level can be prevented by the separate member and, thus, the oil easily stays at a position at which the liquid fluid sensor is disposed at a lower position than the separate member. As a result, the detection accuracy of the liquid fluid sensor can be increased.

The separate member can have a concave portion (e.g., a concave portion 71*b* of the embodiment) at a position at which the concave portion faces the liquid fluid sensor, and at least part of the liquid fluid sensor can be disposed in the concave portion. In such a configuration of the embodiment, the two members, that is, the liquid fluid sensor and the separate member can be disposed so as to be close to each other. Thus, even when the two members overlaps each other when viewed in the vertical direction, the two members can be disposed at substantially the same height.

The intake port can be disposed so as to be closer to a central portion of the reservoir than the liquid fluid sensor when viewed in the vertical direction. It is not desirable that the liquid fluid sensor and the intake port be exposed above the oil level. In such a configuration of the embodiment, since the tolerance of the liquid fluid sensor to exposure is higher than that of the intake port, the intake port is disposed closer to the central portion in which a variation of the oil level is small. In this manner, intake of air can be prevented.

The liquid fluid sensor and the separate member can be disposed so that a distance between the lowermost portion of the detection unit of the liquid fluid sensor and a bottom surface (e.g., a bottom wall 103 of the embodiment) of the reservoir is substantially the same as a distance between the lowermost portion of the intake port and the bottom surface of the reservoir. In such a configuration of the embodiment, by maintaining the appropriate distances from the bottom surface, contact of the members with the bottom surface can be prevented when mounted. In addition, a dead space can be reduced.

The liquid fluid sensor can be fixed to the outer side of the cover member, and the separate member can be fixed to the inner side of the cover member. In such a configuration of the embodiment, by separately mounting the liquid fluid sensor and the separate member on the inside and the outside of the cover member, interference between the fixing portions of the two members can be prevented.

The opening can be formed in a surface of the case that faces in the horizontal direction, and the cover member can be mounted on the surface that faces in the horizontal direction. In such a configuration of the embodiment, since the liquid fluid sensor is mounted while avoiding the lower side of the case, damage of the liquid fluid sensor from the outside can be prevented. In addition, since the liquid fluid sensor is disposed while avoiding the upper side of the case, a member (e.g., a floor) that is disposed above the case can be disposed at a lower position.

Each of the liquid fluid sensor and the separate member can be formed so as to fit into an outer edge projection area defined when a case fixing portion (e.g., a case fixing portion 72*a* of the embodiment) of the cover member is projected. In such a configuration of the embodiment, when the separate member is inserted into the opening and, thereafter, the cover member is mounted on the opening, the two members, that is, the liquid fluid sensor and the separate member negligibly interfere with each other.

The separate member can include a filter member that filters the liquid fluid. In such a configuration of the embodiment, the filter member and the cover member can be handled in an integrated fashion. Accordingly, by removing the cover member from the case and, thereafter, removing the separate member from the cover member, maintenance and replacement of the filter member can be facilitated.

A liquid fluid supply device (e.g., an electric oil pump 70 of the embodiment) that communicates with the second communication hole and that supplies the liquid fluid can be fixed to the outer side of the cover member. In such a configuration of the embodiment, the four members, that is, the liquid fluid sensor, the separate member, the liquid fluid supply device, and the cover member can be handled in an integrated fashion.

A valve member (e.g., the low-pressure oil passage changeover valve 73, the brake oil passage changeover valve 74, and the relief valve 84 of the embodiment) disposed in a liquid fluid flow path that communicates with the liquid fluid supply device is fixed to the cover member. In such a configuration of the embodiment, the five members, that is, the liquid fluid sensor, the separate member, the liquid fluid supply device, the cover member, and the valve member can be handled in an integrated fashion.

The case according to the embodiment can contain the motor.

Obviously, numerous modifications and variations of the present invention are possible in light of the above teachings. It is therefore to be understood that within the scope of the appended claims, the invention may be practiced otherwise than as specifically described herein.

What is claimed is:
1. A vehicle drive apparatus comprising:
a motor connected to a wheel of a vehicle to transmit power from the motor to the wheel;
a case including a reservoir to store liquid fluid used for at least one of cooling of the motor, lubrication of the motor, cooling of a power transmission path between the motor and the wheel, and lubrication of the power transmission path, the case having an opening through which an inside of the case is to fluidly communicate with an outside of the case;
a cover member removably mounted on the opening to close the opening in a state where the cover member is mounted on the opening, the cover member forming a part of the case and including at least two communication holes through which an inner side of the cover member is to fluidly communicate with an outer side of the cover member in the state where the cover member is mounted on the opening;
a sensor configured to detect a property of the liquid fluid and including a detector disposed in the reservoir of the case, the sensor being provided in a first communication hole of the at least two communication holes of the cover member and being fixed to the cover member, a second communication hole of the at least two communication holes constituting a part of a fluid flow path extending from the inside of the case to the outside of the case, the fluid flow path having an intake port through which the liquid fluid is to be drawn, the intake port being provided at a first end of the fluid flow path, the first end being disposed in the reservoir, the fluid flow path including an inside fluid flow path provided from the second communication hole to the intake port; and
a separate member fixed to the cover member to define the inside fluid flow path,
wherein in the state where the cover member is mounted on the opening, both the sensor and the separate member are disposed in the reservoir, and
wherein in the state where the cover member is removed from the opening, the sensor is separated from the reservoir of the case and remains in the first communication hole.

2. The vehicle drive apparatus according to claim 1, wherein the sensor and the separate member are disposed so as to overlap each other when viewed in a vertical direction.

3. The vehicle drive apparatus according to claim 2, wherein the sensor is disposed at a position lower than the separate member.

4. The vehicle drive apparatus according to claim 2, wherein the intake port is disposed so as to be closer to a central portion of the reservoir than the sensor when viewed in the vertical direction.

5. The vehicle drive apparatus according to claim 2, wherein a distance between a lowermost portion of the detector of the sensor and a bottom surface of the reservoir is substantially the same as a distance between a lowermost portion of the intake port and the bottom surface of the reservoir.

6. The vehicle drive apparatus according to claim 1, wherein the sensor and the separate member are disposed so as to overlap each other when viewed in a horizontal direction.

7. The vehicle drive apparatus according to claim 1,
wherein the sensor is fixed to the outer side of the cover member, and
wherein the separate member is fixed to the inner side of the cover member.

8. The vehicle drive apparatus according to claim 7,
wherein the opening is formed in a surface of the case that faces in a horizontal direction, and
wherein the cover member is mounted on the surface that faces in the horizontal direction.

9. The vehicle drive apparatus according to claim 1,
wherein each of the sensor and the separate member is formed so as to fit into an outer edge projection area defined by the cover member, and
wherein the outer edge projection area projects from the cover member.

10. The vehicle drive apparatus according to claim 1, wherein the separate member includes a filter member to filter the liquid fluid.

11. The vehicle drive apparatus according to claim 1, further comprising:
a liquid fluid supply device provided to communicate with the second communication hole and to supply the liquid fluid, the liquid fluid supply device being fixed to the outer side of the cover member.

12. The vehicle drive apparatus according to claim 11, further comprising:
a valve member disposed in a liquid fluid flow path that communicates with the liquid fluid supply device, the valve member being fixed to the cover member.

13. The vehicle drive apparatus according to claim 1, wherein the case contains the motor.

14. The vehicle drive apparatus according to claim 1, wherein the first communication hole is provided at a position lower than the second communication hole.

15. The vehicle drive apparatus according to claim 1,
wherein the cover member includes a case fixing portion that forms an outer peripheral edge of the cover member, and
wherein the separate member is fixed to the cover member so as to extend within the reservoir to a position closer to a central portion of the reservoir than the outer peripheral edge of the case fixing portion in the state where the cover member is mounted on the opening.

16. The vehicle drive apparatus according to claim 1, wherein the cover member is removably mounted on the opening such that the sensor, the cover member, and the separate member are movable as a single integrated unit.

17. The vehicle drive apparatus according to claim 1, further comprising a liquid fluid supply device fixed to the outer side of the cover member,
wherein the cover member is removably mounted on the opening such that the liquid fluid supply device, the sensor, the cover member, and the separate member are movable as a single integrated unit.

18. The vehicle drive apparatus according to claim 1, wherein the separate member and the sensor are disposed at substantially a same height.

19. The vehicle drive apparatus according to claim 1, wherein the reservoir further comprises a left reservoir portion and a right reservoir portion opposed about a width direction of the vehicle drive apparatus, both the sensor and the separate member being disposed between the left reservoir portion and the right reservoir portion in the state where the cover member is mounted on the opening.

20. The vehicle driving apparatus according to claim 1, wherein the case contains the motor and the cover member forms a wall surface of the reservoir to retain the liquid fluid in the case at a position below the motor.

21. The vehicle drive apparatus according to claim 1,
wherein in the state where the cover member is mounted on the opening, the sensor is disposed at a position lower than the separate member in the reservoir, and
wherein the detector is disposed in the reservoir of the case and the sensor is provided in the first communication hole of the cover member and fixed to the cover member such that in the state where the cover member is removed from the opening, the sensor is separated from the reservoir of the case and remains in the first communication hole, and the sensor remains disposed lower than the separate member.

22. The vehicle drive apparatus according to claim 1, wherein the opening is disposed at a front side of the reservoir and the cover member closes the opening at the front side of the reservoir, and
wherein in the state where the cover member is mounted on the opening, both the sensor and the separate member are disposed in the reservoir at the front side of the reservoir.

23. The vehicle drive apparatus according to claim 22, wherein the front side of the reservoir is disposed in a direction substantially orthogonal to a longitudinal axis defined by a shaft of the motor.

24. A vehicle drive apparatus comprising:
a motor connected to a wheel of a vehicle to transmit power from the motor to the wheel;
a case including a reservoir to store liquid fluid used for at least one of cooling of the motor, lubrication of the motor, cooling of a power transmission path between the motor and the wheel, and lubrication of the power transmission path, the case having an opening through which an inside of the case is to fluidly communicate with an outside of the case;
a cover member removably mounted on the opening to close the opening in a state where the cover member is mounted on the opening, the cover member forming a part of the case and including at least two communication holes through which an inner side of the cover member is to fluidly communicate with an outer side of the cover member in the state where the cover member is mounted on the opening;
a sensor configured to detect a property of the liquid fluid and including a detector disposed in the reservoir, the sensor being provided in a first communication hole of the at least two communication holes and being fixed to the cover member, a second communication hole of the at least two communication holes constituting a part of a fluid flow path extending from the inside of the case to the outside of the case, the fluid flow path having an intake port through which the liquid fluid is to be drawn, the intake port being provided at a first end of the fluid flow path, the first end being disposed in the reservoir, the fluid flow path including an inside fluid flow path provided from the second communication hole to the intake port; and
a separate member fixed to the cover member to define the inside fluid flow path,
wherein the sensor and the separate member are disposed so as to overlap each other when viewed in a vertical direction,
wherein the separate member has a concave portion provided to face the sensor, and
wherein at least part of the sensor is disposed in the concave portion.

25. A vehicle drive apparatus comprising:
a motor connected to a wheel of a vehicle to transmit power from the motor to the wheel;
a case including a reservoir to store liquid fluid used for at least one of cooling of the motor, lubrication of the motor, cooling of a power transmission path between the motor and the wheel, and lubrication of the power transmission path, the case having an opening through which an inside of the case is to fluidly communicate with an outside of the case;
a cover member removably mounted on the opening to close the opening in a state where the cover member is mounted on the opening, the cover member forming a part of the case and including at least two communication holes through which an inner side of the cover member is to fluidly communicate with an outer side of the cover member in the state where the cover member is mounted on the opening;
a sensor configured to detect a property of the liquid fluid and including a detector disposed in the reservoir, the sensor being provided in a first communication hole of the at least two communication holes and being fixed to the cover member, a second communication hole of the at least two communication holes constituting a part of a fluid flow path extending from the inside of the case to the outside of the case, the fluid flow path having an intake port through which the liquid fluid is to be drawn, the intake port being provided at a first end of the fluid flow path, the first end being disposed in the reservoir, the fluid flow path including an inside fluid flow path provided from the second communication hole to the intake port; and
a separate member fixed to the cover member to define the inside fluid flow path,
wherein in the state where the cover member is mounted on the opening, both the sensor and the separate member are disposed in the reservoir, and
wherein the sensor and the separate member are disposed so as to overlap each other when viewed in a vertical direction and when viewed in a horizontal direction.

* * * * *